US006441808B1

(12) United States Patent
Hashimoto

(10) Patent No.: US 6,441,808 B1
(45) **Date of Patent: *Aug. 27, 2002**

(54) KEY LAYOUT SETTING APPARATUS TO LAY OUT PLURALITY OF KEYS ARBITRARILY FOR DATA INPUT, KEY LAYOUT SETTING METHOD, COMPUTER-READABLE RECORDING MEDIUM IN WHICH KEY LAYOUT SETTING PROGRAM IS STORED, AND PROGRAM PRODUCT FOR KEY LAYOUT SETTING PROGRAM

(75) Inventor: Manabu Hashimoto, Kitakatsuragi-gun (JP)

(73) Assignee: Sharp Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/338,395

(22) Filed: Jun. 22, 1999

(30) Foreign Application Priority Data

Jun. 22, 1998 (JP) .......................................... 10-175014

(51) Int. Cl.[7] ................................................ G09G 5/00

(52) U.S. Cl. ....................... 345/173; 345/172; 345/815; 345/840

(58) Field of Search ................................ 345/127, 129, 345/130, 173, 343, 172, 815, 840

(56) References Cited

U.S. PATENT DOCUMENTS 5,727,162 A * 3/1998 Nakamura .................. 395/325
5,764,226 A * 6/1998 Consolatte et al. ......... 345/333
5,936,614 A 8/1999 An et al. ..................... 345/173
6,011,550 A * 1/2000 Capps et al. ................ 345/815
6,104,384 A * 8/2000 Moon et al. ................ 345/840

FOREIGN PATENT DOCUMENTS

GB 2217499 10/1989 ............. G06F/3/02
JP 5-73196 3/1993
JP 5-108232 4/1993 ............. G06F/3/02
JP 5-197471 8/1993

OTHER PUBLICATIONS

European Patent Office Communication dated Jun. 3, 2002 regarding European Search Report.

* cited by examiner

*Primary Examiner*—Richard Hjerpe
*Assistant Examiner*—Duc Q. Dinh
(74) *Attorney, Agent, or Firm*—Dike, Bronstein, Roberts & Cushman-IP Group; David G. Conlin; George W. Hartnell, III

(57) ABSTRACT

A free key layout setting apparatus is mounted in a data input apparatus. The data input apparatus includes a display unit covered with a touch panel. A plurality of keys are laid out and displayed on a display screen of the display unit according to layout data prestored in a ROM or a RAM. When an arbitrary key is touched through the touch panel in the display screen, a CPU of the data input apparatus carries out a function corresponding to that key. In setting the layout data to lay out each of the plurality of keys at an arbitrary position in the display screen in the free key layout setting apparatus, the CPU generates layout data as desired by the user including various data such as the size for display, the display position, a code identifying the type of the function of the ECR executed by operation of a key, and a character string of a label displayed on a key. The layout data is stored in the ROM or the RAM.

13 Claims, 33 Drawing Sheets

| POSITION NUMBER (21A) | SKSN CODE (21B) |
|---|---|
| 1 | NON |
| 2 | NON |
| : | : |
| 46 | 0 SKSN |
| 47 | 1 SKSN |
| : | : |
| 80 | CA/AT |

| POSITION NUMBER (22A) | SKSN CODE (22B) |
|---|---|
| 1 | NON |
| 2 | NON |
| 36 | 0 SKSN |
| 37 | 1 SKSN |
| : | : |
| 60 | CA/AT |

| POSITION NUMBER (21A) | X COORDINATE DATA (23B) | Y COORDINATE DATA (23C) |
|---|---|---|
| 1 | 0 | 0 |
| 2 | 8 | 0 |
| 3 | 16 | 0 |
| : | : | : |
| 80 | 72 | 21 |

| POSITION NUMBER | X COORDINATE DATA | Y COORDINATE DATA |
|---|---|---|
| 1 | 0 | 0 |
| 2 | 8 | 0 |
| 3 | 16 | 0 |
| : | : | : |
| 60 | 72 | 20 |

| POSITION NUMBER | SKSN CODE |
|---|---|
| 1 | NON |
| 2 | NON |
| 46 | 0 SKSN |
| 47 | 1 SKSN |
| : | : |
| 80 | CA/AT |

| POSITION NUMBER | SKSN CODE |
|---|---|
| 1 | NON |
| 2 | NON |
| 46 | MENU1 |
| 47 | MENU2 |
| : | : |
| 80 | CA/AT |

| SKSN CODE (33A) | X COORDINATE DATA (33B) | Y COORDINATE DATA (33C) | WIDTH DATA (33D) | HEIGHT DATA (33E) |
|---|---|---|---|---|
| 0 SKSN | 40 | 13 | 16 | 3 |
| 1 SKSN | 43 | 13 | 8 | 3 |
| 2 SKSN | 46 | 13 | 8 | 3 |
| 3 SKSN | 49 | 13 | 8 | 3 |

| 34A: SKSN CODE | 34B: TEXT DATA |
|---|---|
| DIRECT 1 SKSN | JUCE |
| DIRECT 2 SKSN | ORANGE JUICE |
| DIRECT 3 SKSN | APPLE JUICE |
| DIRECT 4 SKSN | COLA |

FIG. 12

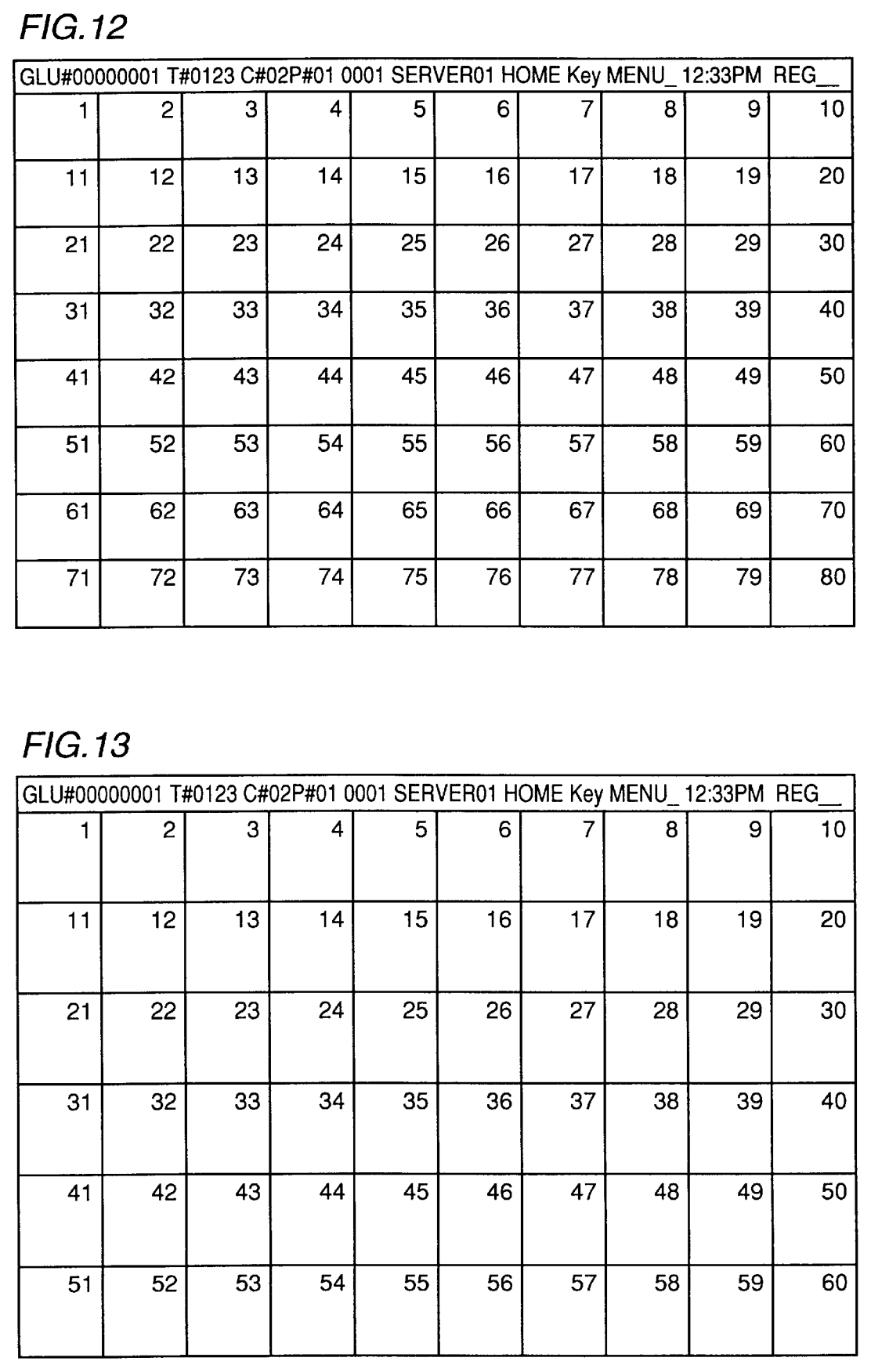

| GLU#00000001 T#0123 C#02P#01 0001 SERVER01 HOME Key MENU_ 12:33PM REG__ | | | | | | | | | |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |

FIG. 13

| GLU#00000001 T#0123 C#02P#01 0001 SERVER01 HOME Key MENU_ 12:33PM REG__ | | | | | | | | | |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |

FIG.14A
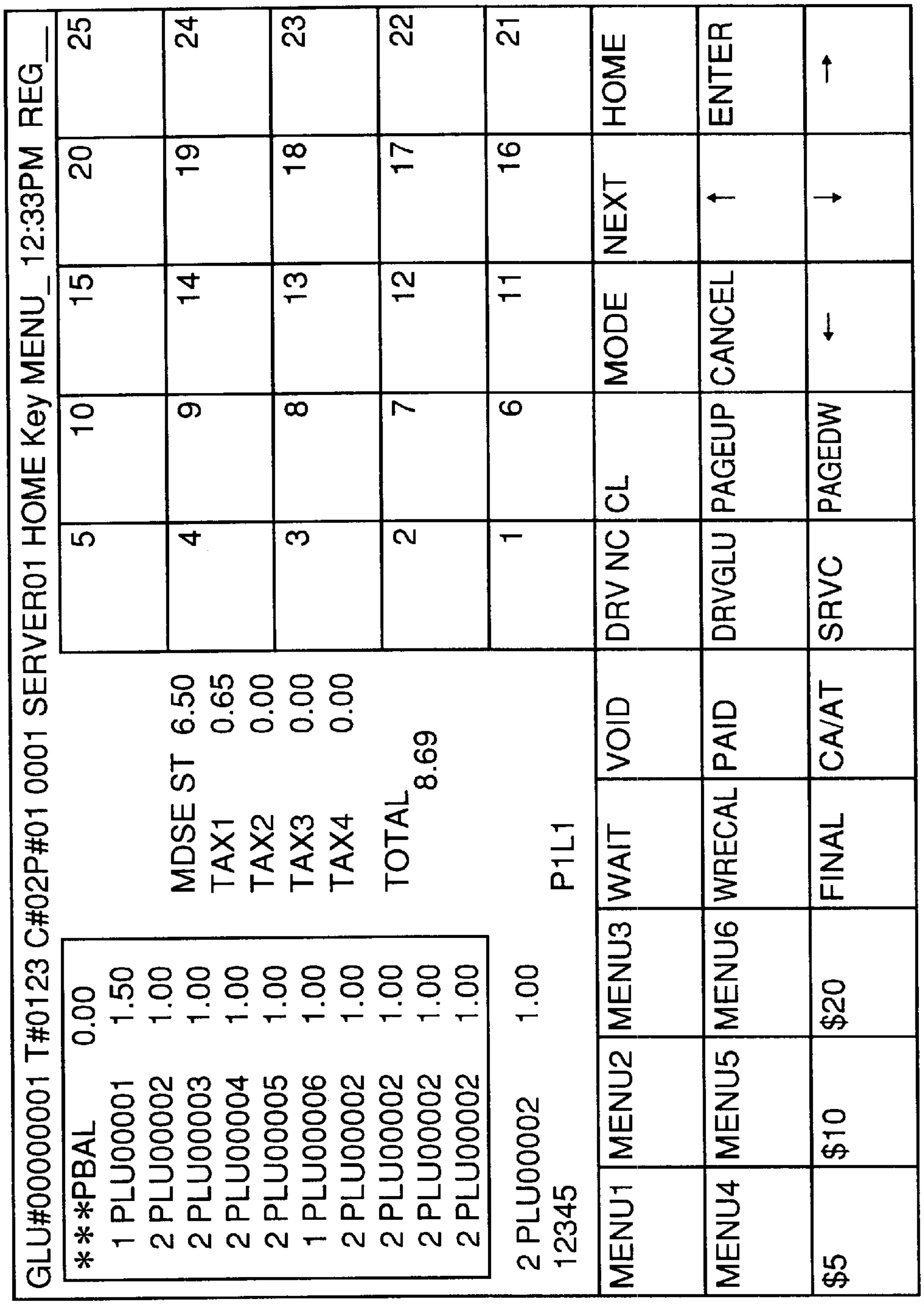
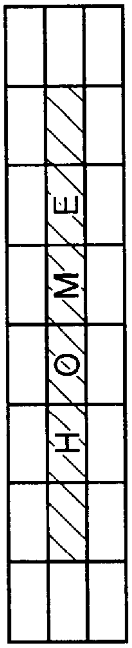
FIG.14B

FIG. 17

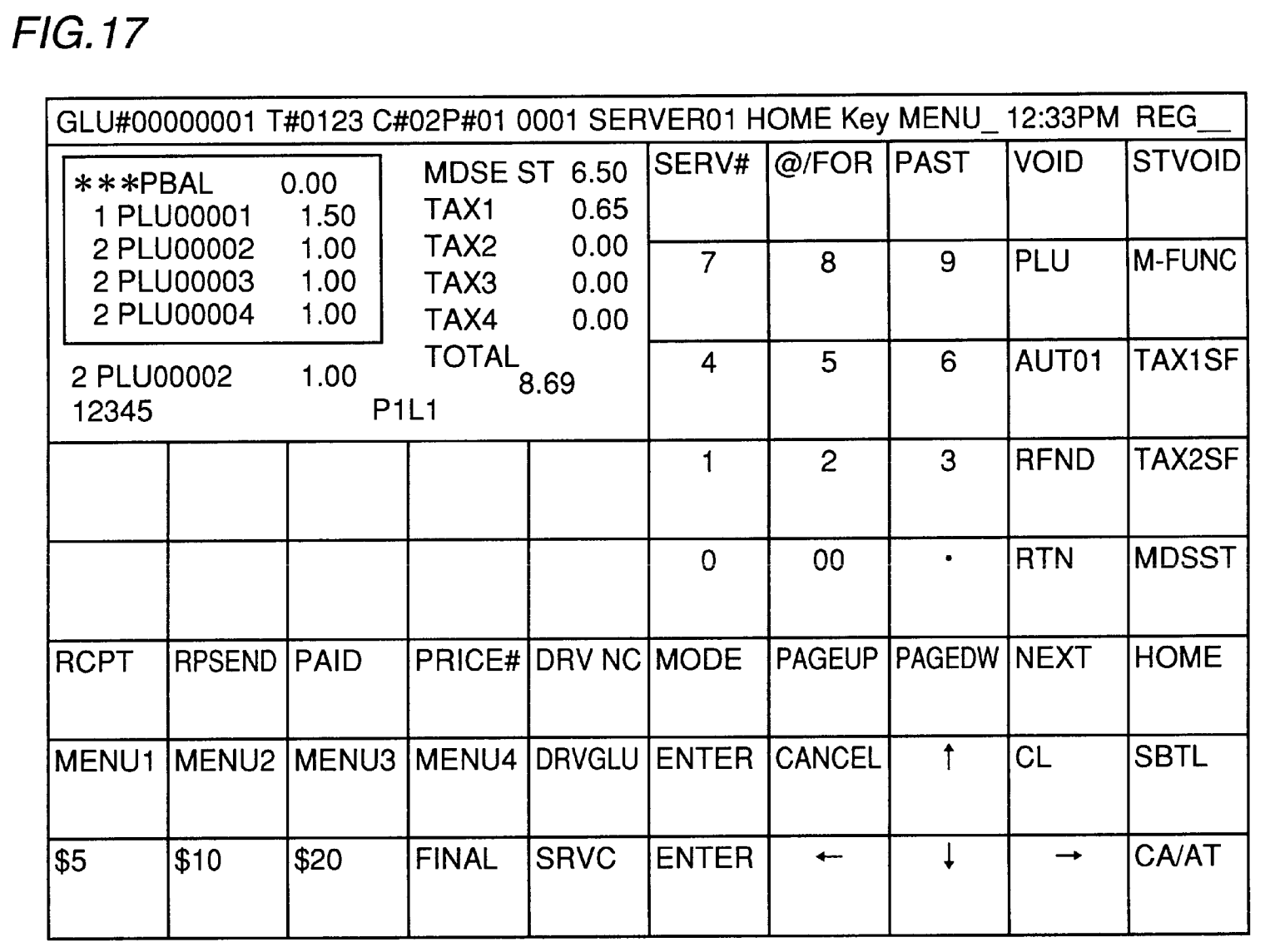

GLU#00000001 T#0123 C#02P#01 0001 SERVER01 HOME Key MENU_ 12:33PM REG__

| | |
|---|---|
| ***PBAL | 0.00 |
| 1 PLU00001 | 1.50 |
| 2 PLU00002 | 1.00 |
| 2 PLU00003 | 1.00 |
| 2 PLU00004 | 1.00 |

2 PLU00002 1.00
12345 P1L1

| | |
|---|---|
| MDSE ST | 6.50 |
| TAX1 | 0.65 |
| TAX2 | 0.00 |
| TAX3 | 0.00 |
| TAX4 | 0.00 |
| TOTAL | 8.69 |

| | | | | | | | | | |
|---|---|---|---|---|---|---|---|---|---|
| | | | | | SERV# | @/FOR | PAST | VOID | STVOID |
| | | | | | 7 | 8 | 9 | PLU | M-FUNC |
| | | | | | 4 | 5 | 6 | AUT01 | TAX1SF |
| | | | | | 1 | 2 | 3 | RFND | TAX2SF |
| | | | | | 0 | 00 | • | RTN | MDSST |
| RCPT | RPSEND | PAID | PRICE# | DRV NC | MODE | PAGEUP | PAGEDW | NEXT | HOME |
| MENU1 | MENU2 | MENU3 | MENU4 | DRVGLU | ENTER | CANCEL | ↑ | CL | SBTL |
| $5 | $10 | $20 | FINAL | SRVC | ENTER | ← | ↓ | → | CA/AT |

KEY LAYOUT SETTING APPARATUS TO LAY OUT PLURALITY OF KEYS ARBITRARILY FOR DATA INPUT, KEY LAYOUT SETTING METHOD, COMPUTER-READABLE RECORDING MEDIUM IN WHICH KEY LAYOUT SETTING PROGRAM IS STORED, AND PROGRAM PRODUCT FOR KEY LAYOUT SETTING PROGRAM

BACKGROUND OF THE INVENTION

1. Field of the Invention

The present invention relates to a key layout setting apparatus applied to data input equipment such as an electronic cash register (abbreviated as ECR hereinafter) or a POS (abbreviation of point-of-sales) terminal including a display screen covered with a touch panel displaying a plurality of touch keys to register an item corresponding to a touch key that is arbitrarily operated, a key layout setting method, a computer-readable recording medium in which a key layout setting program is recorded, and a program product for a key layout setting program. Particularly, the present invention relates to a key layout setting apparatus that allows the layout of a plurality of keys for data input on the display screen in a data input apparatus to be set as desired by the user, a key layout setting apparatus, a computer-readable recording medium in which a key layout setting program is recorded, and a program product for a key layout setting program.

2. Description of the Background Art

Various data input apparatuses have been proposed including a display screen covered with a touch panel displaying a plurality of touch keys to register an item corresponding to a touch key that is arbitrarily operated via the touch panel. For example, Japanese. Patent Laying-Open No. 5-73196 discloses a data input apparatus including a display unit integrated with a touch panel, an identification unit, and a control unit. When an input reception region corresponding to the display region of each key image displayed on the screen is designated by the user through the touch panel, the identification unit identifies the coordinate values of the designated input reception region and generates region modify data to enlarge the relevant input reception region. In response to the generated region modify data, the control unit provides control so that the relevant input reception region is enlarged. Accordingly, a subsequent input operation is facilitated when the same input reception region is designated to input data. An operation reduced in input error is allowed.

Japanese Patent Laying-Open No. 5-197471 discloses an input designation apparatus including a keyboard formed of a screen covered with a touch panel, a determination unit, and a display region enlargement unit. An input designation region corresponding to respective keys of the keyboard is displayed. The determination unit determines the status of selection by the user (for example, the number of selections) via the touch panel with respect to each relevant input designation region. The display region enlargement unit provides the display of each input designation region increased in size according to the determined selection status. Accordingly, a subsequent input operation is facilitated when the same input designation region is designated to input data. An operation reduced in input error is allowed.

The above conventional art is directed to individually increase the input reception region or the input designation region on a region-by-region basis during the operation process according to the relevant status. The user could not change the size of the entire key layout arbitrarily independent of the operation status. Also, the user could not modify the display region of a certain key to a larger size. The operability was not satisfactory. For shops and stores that audit the sales using data input equipment such as an ECR or a POS terminal, characteristic product production and distinction over other stores and firms have become critical in accordance with the severe sales competition. It is indispensable to quickly respond to the change in the market and to the customer's needs. In view of the foregoing, it is strongly desired that the data input apparatus used in sales management can quickly correspond as occasion may demand with respect to the data input capability.

SUMMARY OF THE INVENTION

An object of the present invention is to provide a key layout setting apparatus that can easily modify layout data determining the layout state of a plurality of keys on a display screen as desired, a key layout setting method, a computer-readable recording medium in which a key layout setting program is recorded, and a program product for a key layout setting program.

According to an aspect of the present invention, a key layout setting apparatus of the present invention is directed to set layout data to determine the layout of a plurality of keys on a display screen in a data input apparatus including the display screen provided with a touch panel to register an item corresponding to a relevant key by operating through the touch panel an arbitrary key out of a plurality of keys that are laid out and displayed on a display screen according to the layout data. The key layout setting apparatus includes a layout data setting unit to set the layout data. The layout data setting unit includes a key size select unit to select a desired key size from a plurality of key sizes. The layout data is set according to the desired key size selected by the key size select unit. Since the user can modify and set the layout data so that the plurality of keys are laid out and displayed at the desired key size, the data input apparatus such as an ECR can have the key layout set rapidly corresponding to the change in the market and the customer's needs. Registration error in the registration operation can be reduced by virtue of improvement of the operability with respect to the registration operation of the ECR.

In the key layout setting apparatus, the display region of the display screen includes a key region to display a plurality of keys and a data region to display various data. The layout data setting unit includes a region size select unit to select a desired region size from a plurality of region sizes. The layout data is set so that the data region is laid out on the display screen according to the selected region size.

For example, when the region size is selected to reduce the data region, the key region of the display screen can be enlarged as desired to easily allow increase of the number of laid out keys.

In the above key layout setting apparatus, the layout data setting unit includes a first layout setting unit. The first layout setting unit sets the layout data according to a desired setting style selected from a plurality of predetermined setting styles when layout data is newly set.

Therefore, the user can set the layout data according to the desired setting style by just selecting the desired setting style in the setting process of the layout data. A key layout setting apparatus of high usability for the user can be provided.

The above key layout setting apparatus further includes a layout data storage unit to store one or more types of layout data set by the layout data set unit. The aforementioned plurality of setting styles include a modify style and a copy style. The first layout setting unit sets the desired layout data out of the plurality of types of layout data stored in the layout data storage unit as the new layout data when the copy style is selected. When the modify style is selected, the desired layout data out of the plurality of types of layout data stored in the layout data storage unit has a desired portion modified and then set as the new layout data.

Thus, when the copy style is selected, layout data that is already set is directly used as the new layout data. When the modify style is selected, the layout data already set has a desired portion modified and then used as the new layout data. Thus, the layout data as desired by the user can be set quickly in response to earlier selected setting style.

In the above key layout setting apparatus, the layout data includes for each of the plurality of keys key size data indicating the display size of a relevant key and an identify code to identify the item that is to be registered into the data input apparatus in response to a relevant key operation. The key layout setting apparatus further includes a key size modify unit. The key size modify unit modifies the key size of a predetermined key according to respective identify codes corresponding to the predetermined key and a key adjacent to the predetermined key or the set state of the identify code of the adjacent key when in the key size modify mode to modify the key size data.

Since the key size of a predetermined key on the display screen can be modified (enlarged/shrank), a key layout of high usability corresponding to the usage status of a predetermined key and an adjacent key can be set.

In the key layout setting apparatus, the key size modify unit includes a first key size modify unit. The first key size modify unit modifies the key size data of the predetermined key to include the key size data of the adjacent key when the identify code set corresponding to the identify key and the identify code set corresponding to the adjacent key are identical.

In the above key layout setting apparatus, the key size modify unit further includes a second key size modify unit. The second key size modify unit modifies the key size data of a predetermined key so as to include the key size data of the adjacent key when the identify code corresponding to the adjacent key is not yet set.

Since the key size of a predetermined key can be enlarged arbitrarily according to the identify code of an adjacent key and the setting state thereof through the first and second key size modify units, each key can be set to have an appropriate key size corresponding to the usage status.

The above key layout setting apparatus further includes a key label input unit to input a label identifying a relevant key displayed on the display screen. The label is displayed on the corresponding relevant key. When the number of characters of the label of a predetermined key input through the key label input unit exceeds a predetermined number of characters, the key size modify unit executes the second key size modify unit for the predetermined key.

Since modification to increase the size of the key with a label can be effected, a label as desired by the user can easily be displayed corresponding to a predetermined key to facilitate the key operation.

When the key size of the predetermined key is not increased to the size that allows the display of the number of characters indicated by the label input through the key label input unit as a result of execution of the second key size modify unit in the key layout setting apparatus, notification is made that the label size is erroneous.

Since the user is notified that the size (number of characters) of the label input through the key label input unit corresponding to a predetermined key is too large to be displayed corresponding to the predetermined key, the user can be quickly modify the label to an appropriate number of characters through the key label input unit.

The key layout setting apparatus further includes an output unit to read out and provide each layout data from the layout data storage unit. By providing the layout data via the output unit, information to audit the layout data corresponding to each key in the data input apparatus can be obtained.

A key layout setting method is directed to set layout data to determine the layout of a plurality of keys on a display screen in a data input apparatus including a display screen provided with a touch panel to register an item corresponding to a key in response to operation of an arbitrary key out of a plurality of keys laid out and displayed on the display screen according to the layout data. The key layout setting method includes a layout data setting step to set layout data. The layout data setting step includes a key size select step to select a desired key size from a plurality of key sizes. The layout data is set corresponding to the desired key size selected by the key size select step. Since the user can modify and set the layout data so as to display the plurality of keys at the desired key size, the key layout can be promptly set in the data input apparatus such as an ECR corresponding to the change in the market and customer needs. Also, registration error can be reduced in the registration operation by virtue of improvement in the operability with respect to the registration operation of the ECR and the like.

A computer-readable recording medium in which a key layout setting program is recorded is characterized as set forth in the following. A key layout setting method according to the key layout setting program is directed to set layout data to determine the layout of a plurality of keys on a display screen in a data input apparatus including a display screen provided with a touch panel to register an item corresponding to a relevant key by the operation of an arbitrary key out of a plurality of keys laid out and displayed on a display screen according to the layout data via the touch panel. The key layout setting method includes a layout data setting step to set layout data. The layout data setting step includes a key size select step to select a desired key size from a plurality of key sizes. The layout data is set corresponding to the desired key size selected by the key size select step. Since the user can modify and set the layout data so as to display the plurality of keys at the desired key size, the key layout can be promptly set in the data input apparatus such as an ECR corresponding to the change in the market and customer needs. Also, registration error can be reduced in the registration operation by virtue of improvement in the operability with respect to the registration operation of the ECR and the like.

A computer program product for use in conjunction with a computer system to solve the above object of the present invention is characterized as set forth in the following. The computer program product is directed to set layout data to determine layout of a plurality of keys on a display screen in a data input apparatus including the display screen provided with a touch panel to register an item corresponding to a key by operation through the touch panel of an arbitrary key out of the plurality of keys laid out and displayed on the display screen according to the layout data. The computer program product includes a layout data setting program to set the layout data. The layout data setting program includes a key size select program to select a desired key size from a plurality of key sizes. The layout data is set corresponding to the desired key size selected by the key size select program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2 and 3 are schematic diagrams of a default key layout data table of FIG. 1B.

FIGS. 4 and 5 are schematic diagrams of a position/coordinate data table of FIG. 1B.

FIG. 6 is a schematic diagram of a free key setting table for a home screen of FIG. 1C.

FIG. 7 is a schematic diagram of a free key setting table for a function screen of FIG. 1C.

FIG. 8 is a schematic diagram of a free key data table for display of FIG. 1C.

FIG. 9 is a diagram of a free key text data table for display of FIG. 1C.

FIG. 12 shows a screen display by the smallest key size when the key size of 3×8 is selected according to flow chart of FIG. 10.

FIG. 13 shows a screen display by the smallest key size when the key size of 4×8 is selected according to the flow chart of FIG. 10.

FIGS. 14A and 14B show an example of a screen display when the key size of 3×8 is selected according to the flow chart of FIG. 10.

FIG. 17 shows an example of a screen display when the minimum value is selected for the window size in the flow chart of FIG. 10.

DESCRIPTION OF THE PREFERRED EMBODIMENTS

Figure 1A:
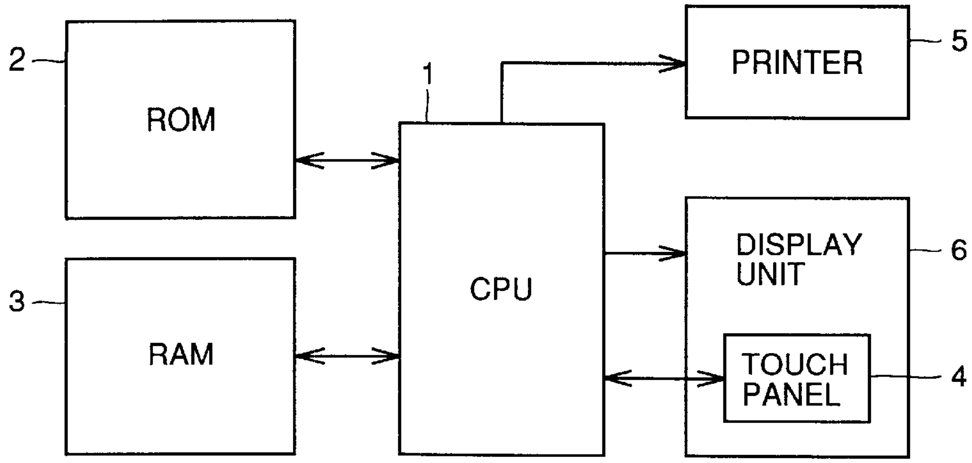
FIGS. 1A, 1B and 1C are schematic diagrams of an ECR mounted with a key layout setting apparatus according to an embodiment of the present invention.

Embodiments of the present invention will be described hereinafter with reference to the drawings. FIGS. 1A shows the schematic structure of an ECR mounted with a key layout setting apparatus according to an embodiment of the present invention. In FIG. 1A, the ECR includes a CPU 1, a ROM 2, a RAM 3, a printer 5, and a display unit 6.

In the ECR of FIG. 1A, the free key layout setting apparatus lays out a plurality of keys on the display screen of display unit 6. A transparent touch panel 4 is attached to the top of the display screen of display unit 6. In response to the touch of touch panel 4 by the user, the XY coordinate data on the display screen corresponding to the touched area is input to CPU 1. ROM 2 and RAM 3 storing various data including the operation program of the ECR are connected to CPU 1. The operation program includes various programs in association with the key layout represented by the various flow charts that will be described afterwards. Printer 5 to output various data including the free key layout set data that will be described afterwards is connected to CPU 1. The free key layout set data is the data to indicate the layout state set arbitrarily for a plurality of keys on the display screen.

The screen displayed at display unit 6 includes at least one home screen and at least one function screen. These plurality of screens are switched and displayed at display unit 6. The home screen is displayed in the normal mode of the ECR. A plurality of default keys are laid out and displayed thereon in a predetermined style. The function screen is switched to be displayed according to the operation of a particular key in the home screen. The function screen is a subscreen of the home screen. The function screen has the key layout displayed in a manner different from that of the home screen.

Figure 1B:
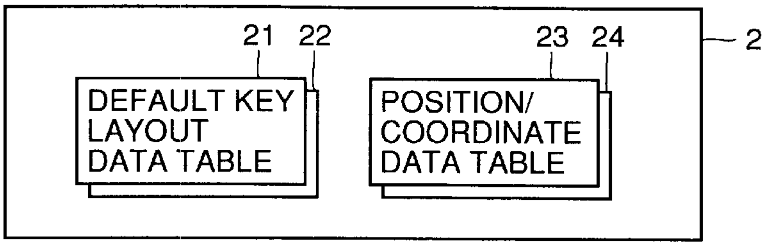
Figure 1C:
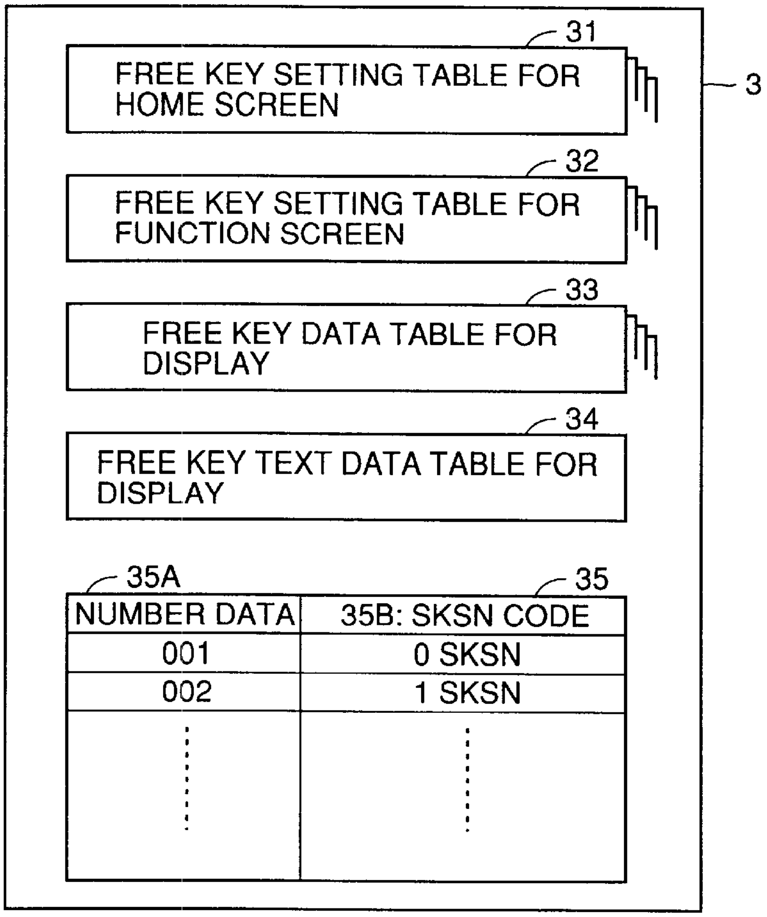

Various data stored in ROM 2 and RAM 3 are shown in FIGS. 1B and 1C. Referring to FIG. 1B, ROM 2 includes default key layout data tables 21 and 22, and position/coordinate data tables 23 and 24. Referring to FIG. 1C, RAM 3 includes a free key setting table 31 corresponding to each of one or more home screens, a free key setting table 32 corresponding to each of one or more function screens, a free key data table 33 for display corresponding to each home screen and each function screen, one free key text data table 34 for display, and an SKSN (abbreviation of soft key serial number) code table 35.

Default key layout data table 21 (22) is shown in FIG. 2 (FIG. 3). Default key layout data table 21 (22) includes an SKSN code 21B (22B) corresponding to respective plurality of position numbers 21A (22A) indicating the layout state on respective screens of the plurality of types of default keys. Each default key is displayed at an appropriate position on touch panel 4, identified by position number 21A (22A). SKSN code 21B (22B) is a code to identify the type of the item input (registered) into the data input apparatus (ECR in the present embodiment) according to the operation of a default key displayed at an identified position by a corresponding position number 21A (22A). Specifically, the plurality of keys provided in the ECR include a PLU key operated to register a product, a CA/AT key operated to register cash finalization, a ten key and the like. A number is assigned to each key using the SKSN code for every type of item.

Each key is identified through the SKSN code when the ECR operation program is executed.

Default key layout data table 21 of FIG. 2 is applied when there are eighty default keys to be laid out on the display screen. Default key layout table 22 of FIG. 3 is applied when there are 60 default keys to be laid out on the display screen.

Position/coordinate data table 23 (24) of FIG. 4 (FIG. 5) is provided corresponding to default key data layout table 21 (22) of FIG. 2 (FIG. 3). Position/coordinate data table 23 (24) includes X coordinate data 23B (24B) and Y coordinate data 23C (24C) indicating the position on the display screen identified by a relevant position number 21A (22A) corresponding to each position number 21A (22A) of FIG. 2 (FIG. 3). The coordinates on the display screen will be described hereinafter. The display screen has the size of, for example, 24 characters in the vertical direction (Y) and 80 characters in the horizontal direction (X). The X coordinate data is set on a 1 character-by-1 character basis in the horizontal direction. The Y coordinate data is set on a 1 character-by-1 character basis in the vertical direction.

Referring to FIG. 6, home screen free key setting table 31 includes a plurality of position numbers 31A set at the home screen, and an SKSN code 31B corresponding to each position number 31A.

Referring to FIG. 7, function screen free key setting table 32 includes a plurality of position numbers 32A set at the function screen, and an SKSN code 32B corresponding to each position number 32A.

Free key setting tables 31 and 32 directed to the home screen and the function screen are shown corresponding to the case where 80 keys are displayed on the screen. However, the same applies for the display of 60 keys.

Referring to FIG. 8, free key data table 33 for display includes data referred to when the key is to be actually displayed in display unit 6. Specifically, a plurality of SKSN codes 33A, X and Y coordinate data 33B and 33C to identify the key display position (light upper corner of key) on the display screen in coordinates corresponding to each SKSN code 33A, and width and height data 33D and 33E indicating the width and vertical length of the display key. Data 33D and 33E of the key width and length are displayed in the units of 1 character.

Referring to FIG. 9, free key text data table 34 for display includes data of the name (label) of a predetermined key displayed in each key when the key is displayed according to the contents of free key data table 33 of FIG. 8. When a key is to be displayed, the contents of free key text data table 34 is referred to, whereby the name (label) is displayed in each key. More specifically, free key text data table 34 for display includes a plurality of SKSN codes 34A, and text data 34B (in characters) indicating the key name (label) corresponding to each SKSN code 34A.

SKSN code table 35 of FIG. 1C stores a plurality of number data 35A arranged in series, and a different SKSN code 35B corresponding to each number data 35A used in the ECR.

In operation, CPU 1 determines the position number corresponding to the touch coordinate from free key data table 33 according to the XY coordinate data input through a touch on touch panel 4. Then, determination is made of which type (SKSN code) of key is arranged in the determined position number by referring to home screen free key setting table 31 or function screen free key setting table 32 to initiate the registration operation. The ECR includes a setting mode to set various data such as those associated with the key layout in the registration mode, in addition to such a registration mode. The ECR enters this setting mode when the ECR is reset and powered on. The key layout displayed in the setting mode is settled in advance. The key layout setting process operation in the setting mode will be described hereinafter.

Figure 10:
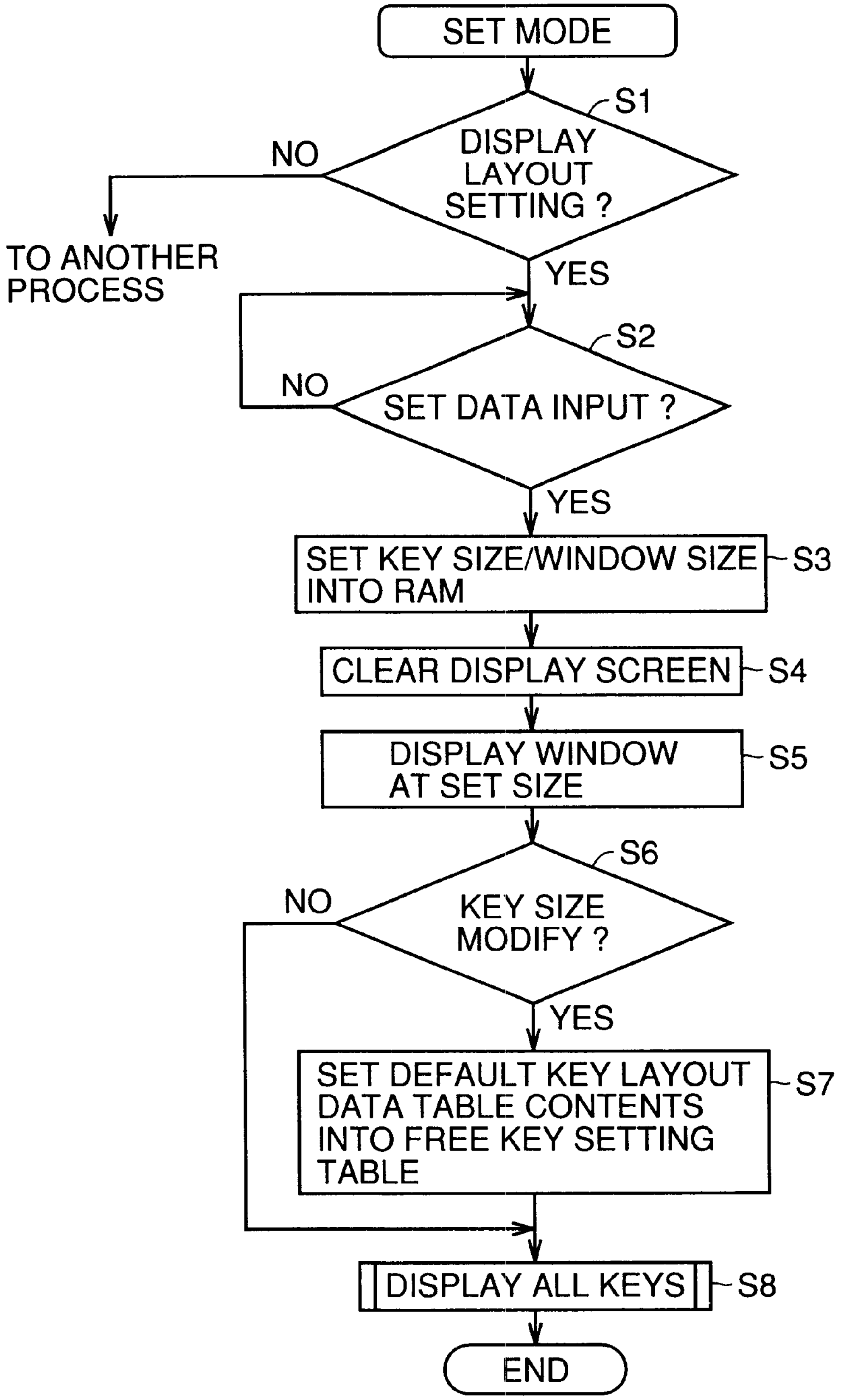
FIG. 10 is a flow chart to process the display layout according to a selected size in an embodiment of the present invention.
Figure 11:
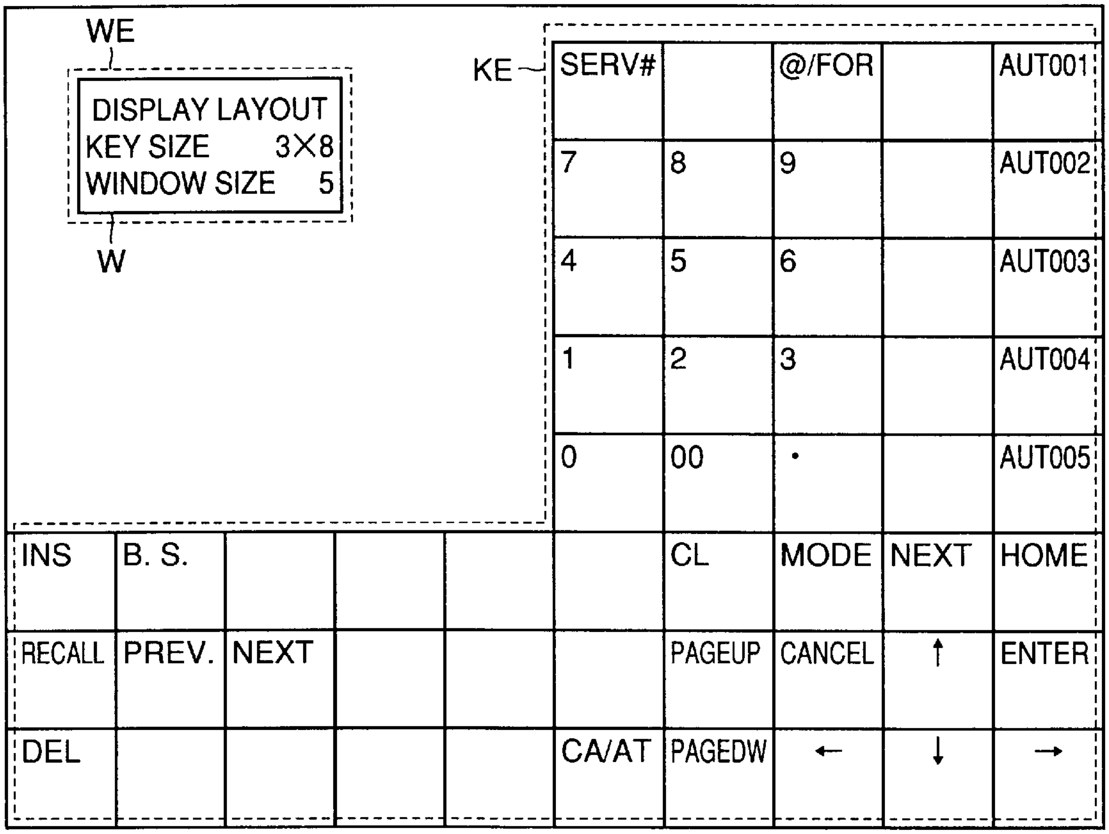
FIG. 11 shows an example of a screen display for setting the key size and window according to the flow chart of FIG. 10.

FIG. 10 shows the process to set the display layout of display unit 6 according to a selected size. FIG. 11 shows an example of a screen display when the size is to be set according to the flow chart of FIG. 10. It is appreciated from FIG. 11 that the display screen region of display unit 6 includes a key region KE where a plurality of keys are laid out and displayed, and a window region WE to display a window W and various examples such as the registration or setting contents of the ECR. Window region WE has a variable size as will be described afterwards.

In the setting mode at the time of power on after the ECR is reset in FIG. 10, a display layout setting mode to set the size of the key and window region WE displayed on the display screen is selected (step S1). Here, a screen as shown in FIG. 11 to select the display layout setting mode is provided on the display screen of the display block. According to the display screen of FIG. 11, the operator selects a key size (KEY SIZE) indicating the size of the key to be displayed and a window size (WINDOW SIZE) indicating the size of window region WE (step S2). More specifically, in the key size selection, the size of either 3×8 or 4×8 is selected. The size of 3×8 implies that the smallest key size is 3 characters×8 characters. The size of 4×8 implies that the smallest key size is 4 characters×8 characters. When the size of 3×8 is selected, one smallest key size corresponds to 24 characters (3 rows×8 columns). When the size of 4×8 is selected, one smallest key size corresponds to 32 characters (4 rows×8 columns). FIG. 12 shows the screen display layout according to the smallest key size of 3×8. In this case, 10 keys in the horizontal direction and 8 keys in the vertical direction, i.e., a total of 80 keys, can be displayed on the screen. FIG. 13 shows the screen display layout according to the smallest key size of 4×8. In this case, 10 keys in the horizontal direction and 6 keys in the vertical direction, i.e. a total of 60 keys, can be displayed on the screen.

Also, the window size is selected. When the smallest key size is 3×8, the window size is selected out of the 6 stages from the key at the third stage to the key at the eighth stage from the top in FIG. 12. When the smallest key size of 4×8 is selected, the window size is selected out of the five stages from the key at the second stage to the key at the sixth stage from the top in FIG. 13.

Upon selection of the key size and the window size, the selected contents are set in RAM 3. The screen display of display unit 6 is cleared (steps S3, S4). Then, a window W is displayed on the screen according to the contents (size) set in RAM 3 (step S5).

Next, CPU 1 determines whether the currently selected smallest key size differs from the previous selected key size (step S6). When the size is altered, the current selection is set in home screen free key setting table 31 (step S7). More specifically, when the key size of 3×8 is selected, the contents of default key layout data table 21 of FIG. 2 are set in home screen free key setting table 31 of RAM 3. When the key size of 4×8 is selected, the contents of default key layout data table 22 of FIG. 3 are set in home screen free key setting table 31 of RAM 3. FIG. 6 corresponds to the case where the contents of default key layout data table 21 of FIG. 2 are set in home screen free key setting table 31.

Figure 15A:
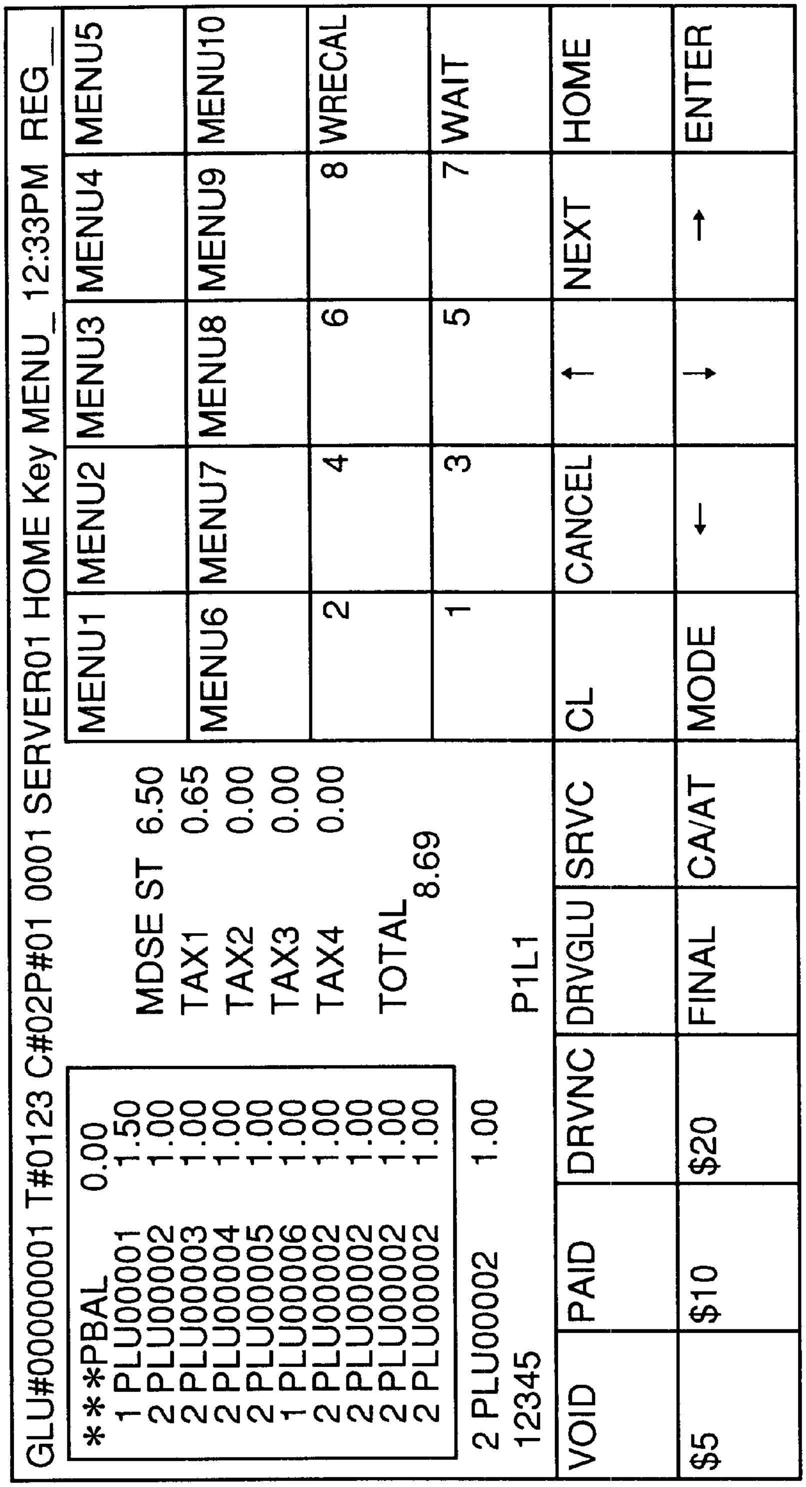
FIGS. 15A and 15B show an example of a screen display when the key size of 4×8 is selected according to the flow chart of FIG. 10.
Figure 15B:
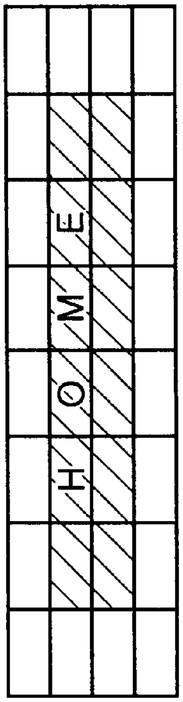
Figure 16:
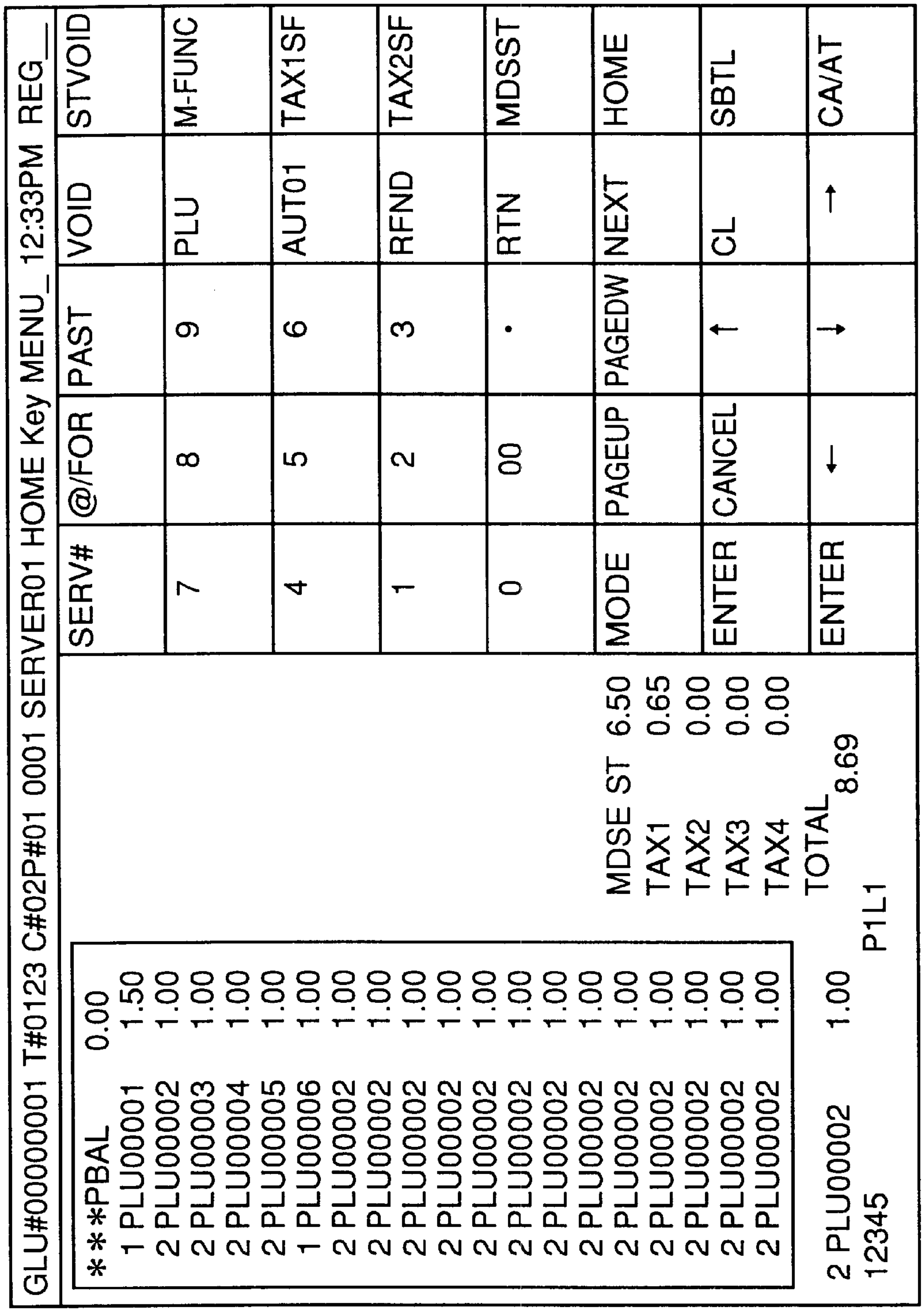
FIG. 16 shows an example of a screen display when the maximum value is selected for the window size in the flow chart of FIG. 10.

Then, all the keys are displayed on the screen of display unit 6 (step S8). More specifically, when the size of 3×8 is selected, the display layout shown in FIG. 14A, for example, is provided. When the size of 4×8 is selected, the display layout of the screen shown in FIG. 15A, for example, is provided. When the maximum value is selected for the size of window region WE when 3×8 is selected, the screen display layout shown in FIG. 16 is provided. When the minimum value is selected for window region WE, the screen display layout of FIG. 17 is provided. FIGS. 14B and 15B show the respective size of each key in characters in FIGS. 14A and 15A. The display area of text data in each key is hatched in FIGS. 14B and 15B.

Figure 19:
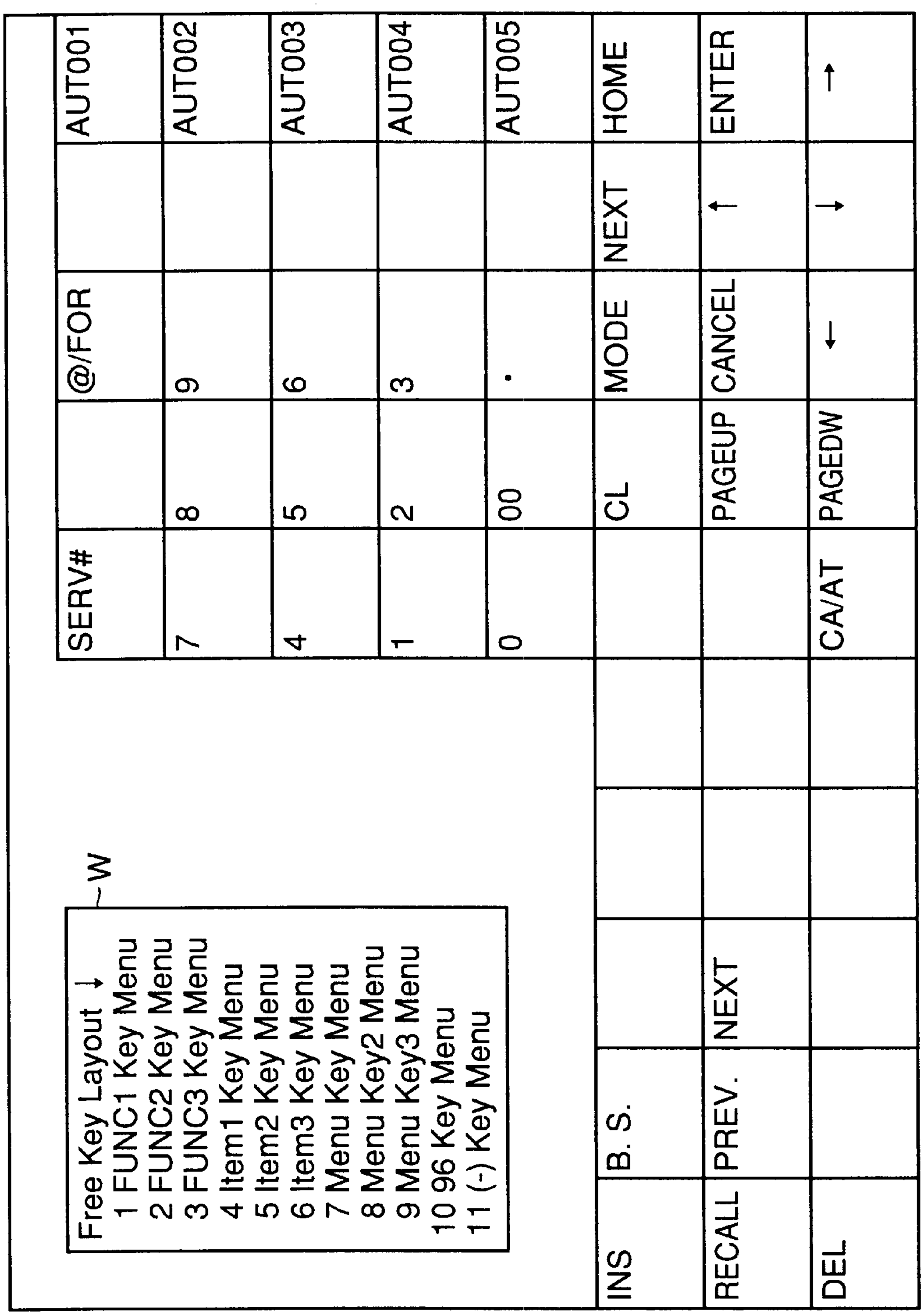
FIGS. 19 and 20 show examples of a select screen displayed in the process of FIG. 18 when free key layout setting is selected.
Figure 20:
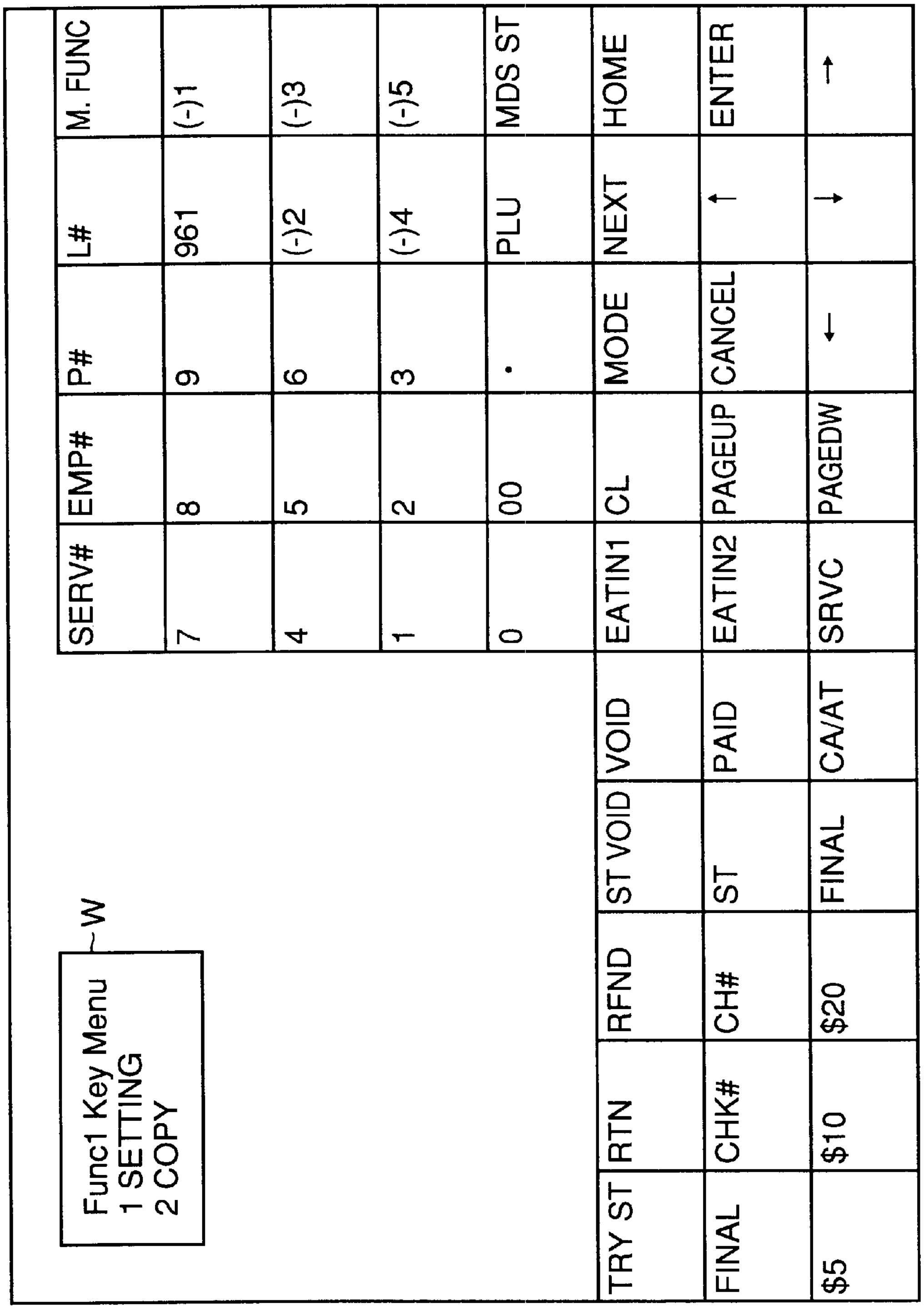

The process to set the key layout according to the selected setting method will be described with reference to FIG. 18. In response to a menu screen not shown that is displayed in the setting mode when the ECR is reset and powered, the operator selects the FREE KEY LAYOUT setting mode (step S11). At this stage, a screen as shown in FIG. 19 to select the free key layout is provided. The operator responds to the display screen of FIG. 19 to select the menu screen to set the key layout from the menu list in window W (step S12). When "1 FUNC1 Key Menu" in window W is selected, the screen of the FIG. 20 is displayed prompting selection of the key layout setting method (1 SETTING, 2 COPY) in the selected "FUNC1 Key Menu" screen. The operator selects the setting method ("SETTING" or "COPY") from the screen of FIG. 20 (step S13).

Figure 21:
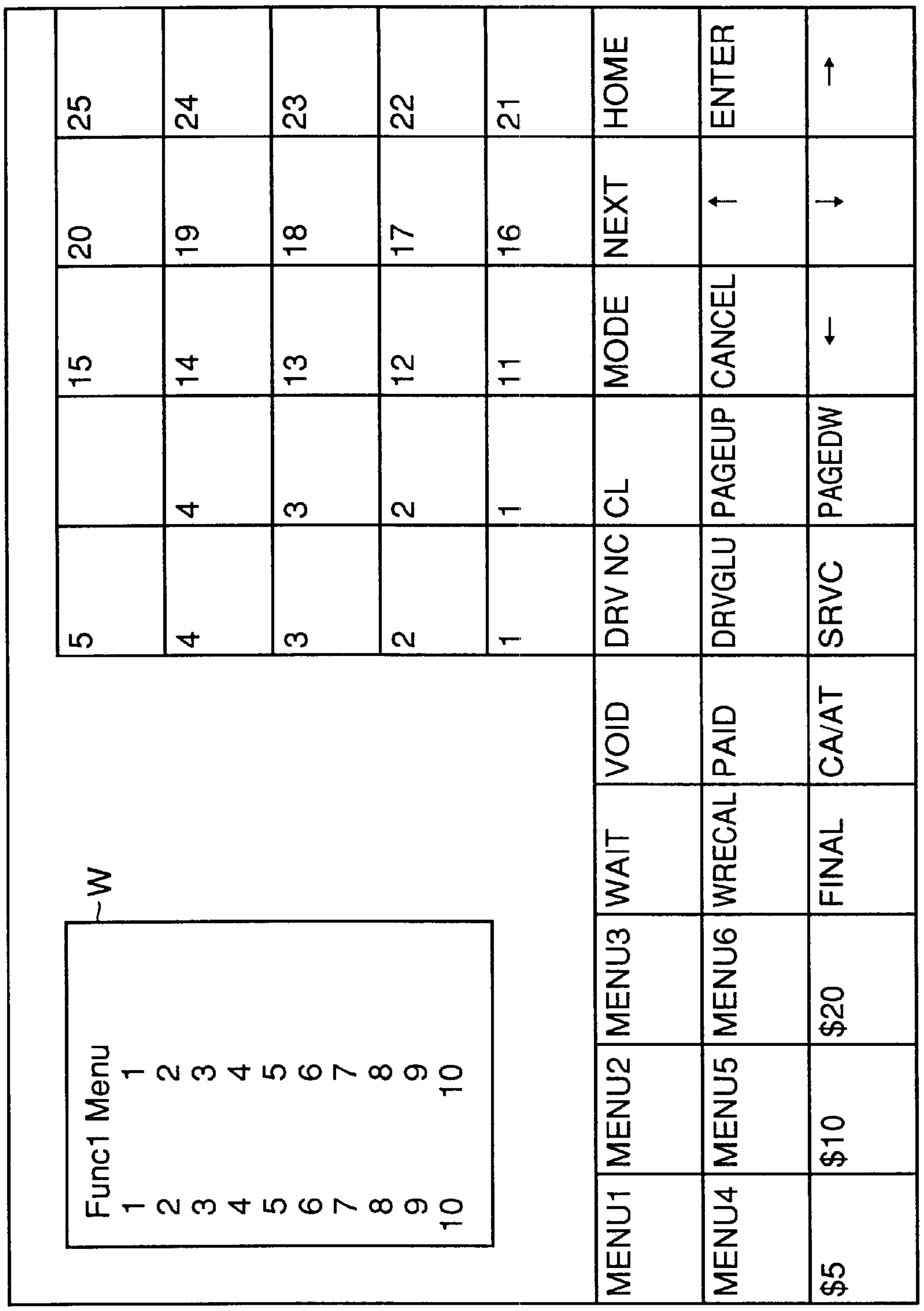
FIG. 21 shows an example of a set screen displayed in the process of FIG. 18 when SETTING is selected in the free key layout setting.

When SETTING is selected, the key list shown in FIG. 21 is displayed in window W (step S14). The user shifts the cursor within window W using the up and down arrow keys to select a desired key to be set from the key list. The position of the selected key on the screen of FIG. 21 is depressed (step S15). Here, a corresponding position number 21A is identified from position/coordinate data table 23 according to the XY coordinate data corresponding to the depressed position. Using the identified position number 21A, function screen free key setting table 32 is searched for. When SKSN code 32B corresponding to the identified position number 32A is preset, i.e. when SKSN code 32B does not indicate "NON", the relevant process is terminated assuming that the setting has been completed (YES at step S16). When a corresponding SKSN code 32B is not set in function key screen free key setting table 32, i.e. when SKSN code 32B indicates "NON", a predetermined code is set in relevant SKSN code 32B (step S17). Then, all the keys are displayed (step S18). The above-described series of process is similarly repeated for each key desired to be set.

Figure 22:
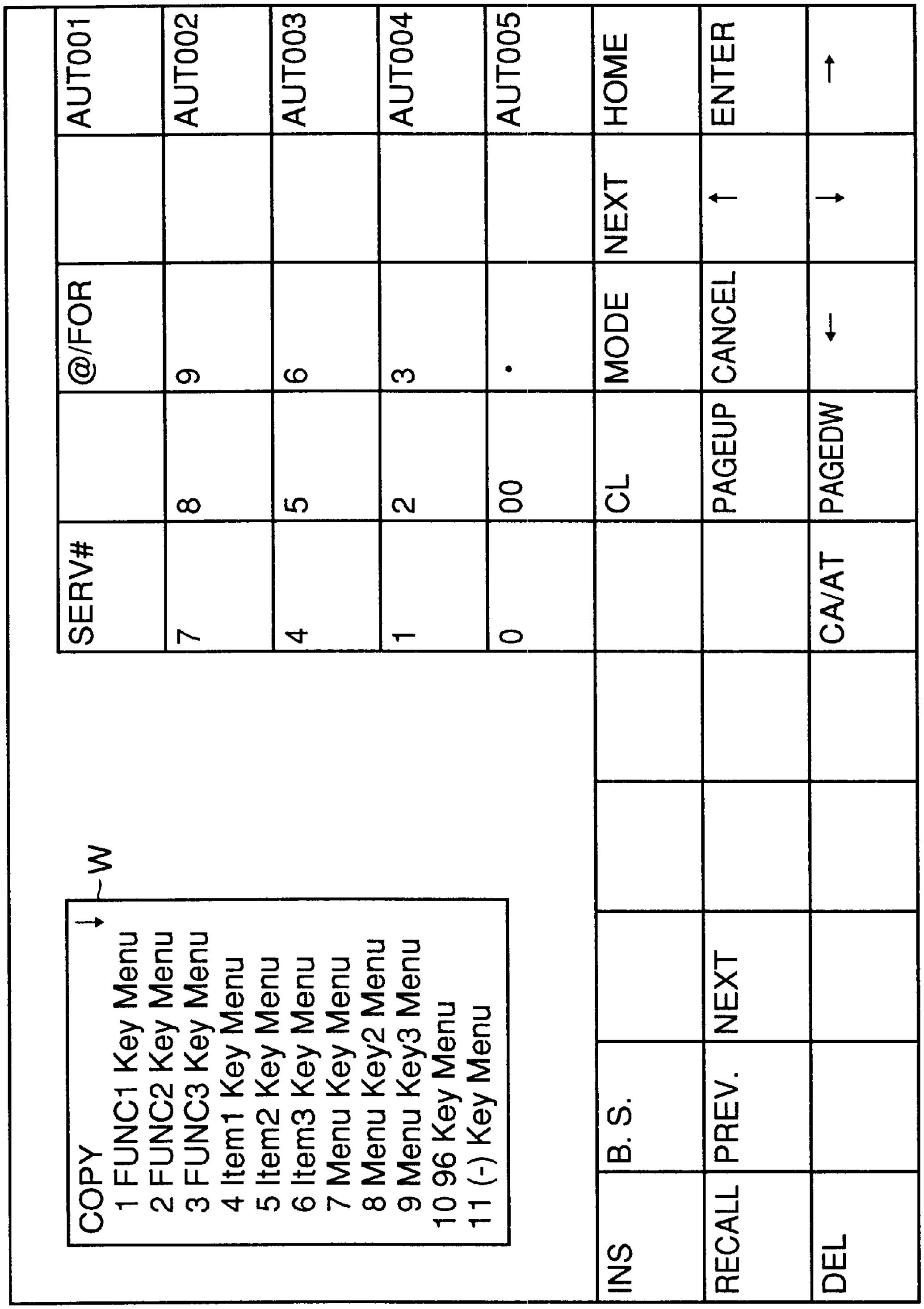
FIG. 22 shows an example of a set screen displayed in the process of FIG. 18 when COPY is selected in the free key layout setting.

When COPY is selected in the select screen of FIG. 20, the screen of FIG. 22 to select the key menu of the source copy is displayed in window W. The operator shifts the cursor in window W using the up and down arrow keys to select the key menu screen of the copy source. The preset contents corresponding to the screen selected as the copy source (for example, the contents of function screen free key setting table 32) is copied into home screen free key setting table 31 (step S20). Then, all the keys are displayed (step S21). Thus, the process ends.

Figure 18:
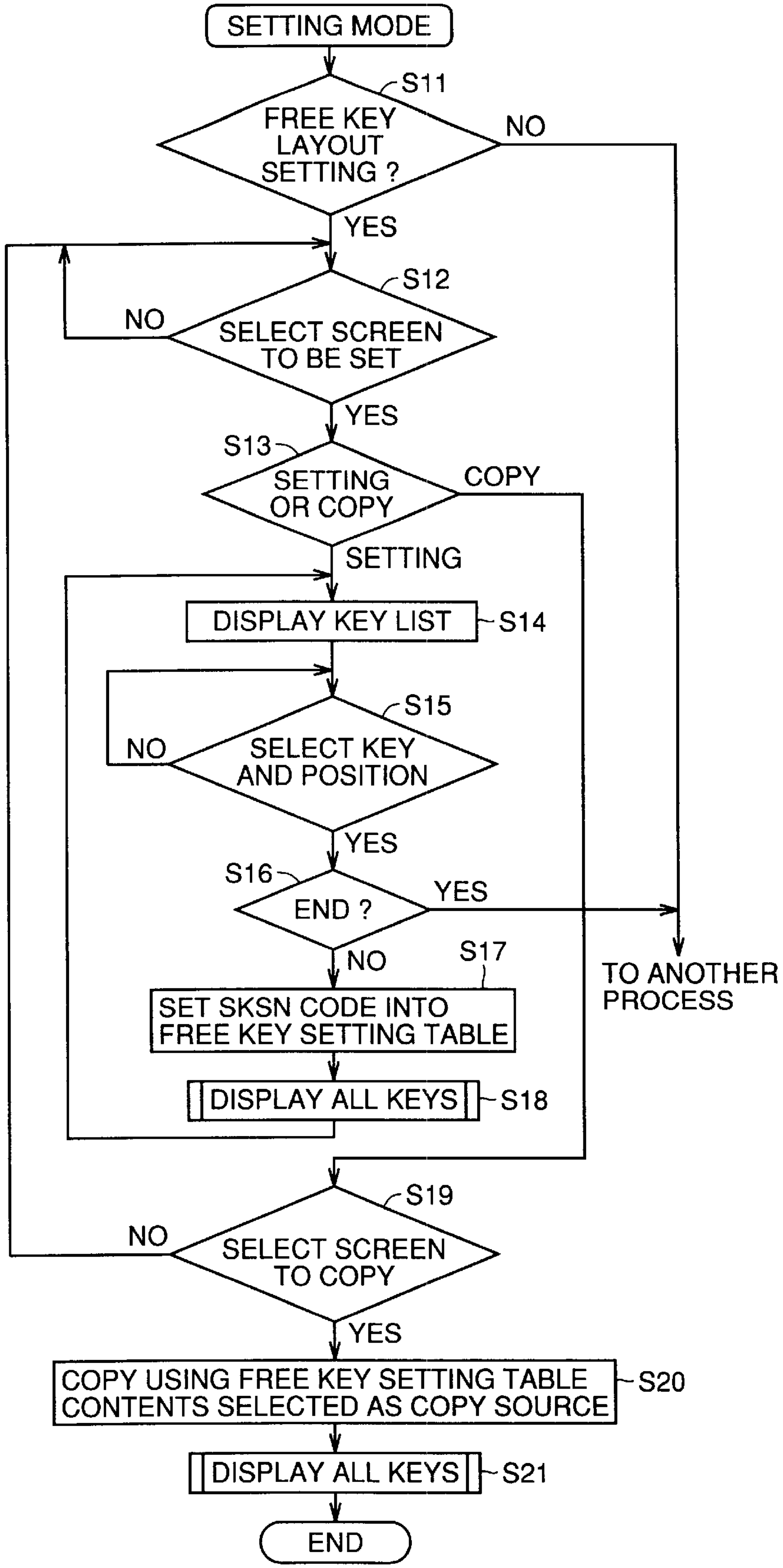
FIG. 18 is a flow chart of the free key layout setting process according to an embodiment of the present invention.

According to the process flow of FIG. 18, respective contents of home screen free key setting table 31 and function screen free key setting table 32 can be individually set on a key-by-key basis for each home screen and each function screen. Also, the contents of free key setting table 31 or 32 of another screen can be directly copied into the free key setting table for the relevant screen to simplify the setting operation.

The operation to modify the size of the key laid out will be described with reference to FIG. 23. CPU 1 reads in the set data (position number 31A and SKSN code 31B) corresponding to a certain key (referred to as "current key" hereinafter) from a preselected screen, for example, preselected home screen free key setting table 31 (step S31). Following the determination made at step S32, XY coordinate data 31B and 33C corresponding to position number 31A of the current key are read in from display free key data table 33 corresponding to the relevant home screen (step S33). The manner of identifying the keys located at the respective positions of above, below, right, and left to a certain key will be described hereinafter with reference to the key layout of FIG. 12, for example. When the position number of a certain key in FIG. 12 is N, the key located above the relevant key is identified by its position number of "N−10". The key located below is identified by the position number of "N+10". The key located leftward is identified by the position number of "N−1". The key located rightwards is identified by the position number of "N+1". At step S33, CPU 1 determines whether the key located below the current key is the same key from the contents of home screen free key setting table 31 (step S34). More specifically, determination is made whether the two keys are identical or not according to whether the two SKSN codes 31B corresponding to position number 31A of the current key and position number 31A corresponding to the key located below the current key has the same value or not in home screen free key setting table 31. When the two keys are not identical, the height (vertical length) of the current key is determined as 3 (unit: characters) (step S35). When the two keys are the same key, the height of the current key is determined as 6 (step S36). Then, CPU 1 determines the width of the current key (unit: characters) according to the determination result of whether the key located rightwards or below and rightwards the current key is identical to the current key and according to the determined height of the current key (steps S37–S39, S381, S382, S391 and S392). More specifically, the width is set as 16 when the keys located at the right and at the right lower position with the height of 6 is identical, otherwise the width is set as 8. Also, when the height is 3, the width is set as 16 when the key located at the right position is the same key, otherwise the width is set to 8.

Next, determination is made whether the XY coordinates of the current key indicate a position outside window region WE (step S40). When the XY coordinates indicate a position located in window region WE, control returns to the process of step S31 to carry out a similar process for the next key since the current key cannot be displayed. The XY coordinates corresponding to a position outside window region WE implies that the current key can be displayed. Therefore, SKSN code 31B of the current key, X and Y coordinate data 23B and 23C of the current key identified in position/coordinate data table 23, the determined height (3 or 6) and the determination width (8 or 16) are relatively set as SKSN code 33A, X coordinate data 33B, Y coordinate data 33C, width data 33D and height data 33E in display free key data table 33 corresponding to the relevant home screen (step S41). Then, control returns to the process of step S31 to carry out a similar process for the next key.

CPU 1 repeats the process of steps S31–S41 for each key corresponding to all the position numbers 31A in home screen free key setting table 31. The data of each key obtained therefrom is set in display free key data table 33. CPU 1 sequentially reads out the data from display free key data table 33 to display all the keys on the relevant home screen in display unit 6 according to the data read out (steps S42–S44).

Figure 23:
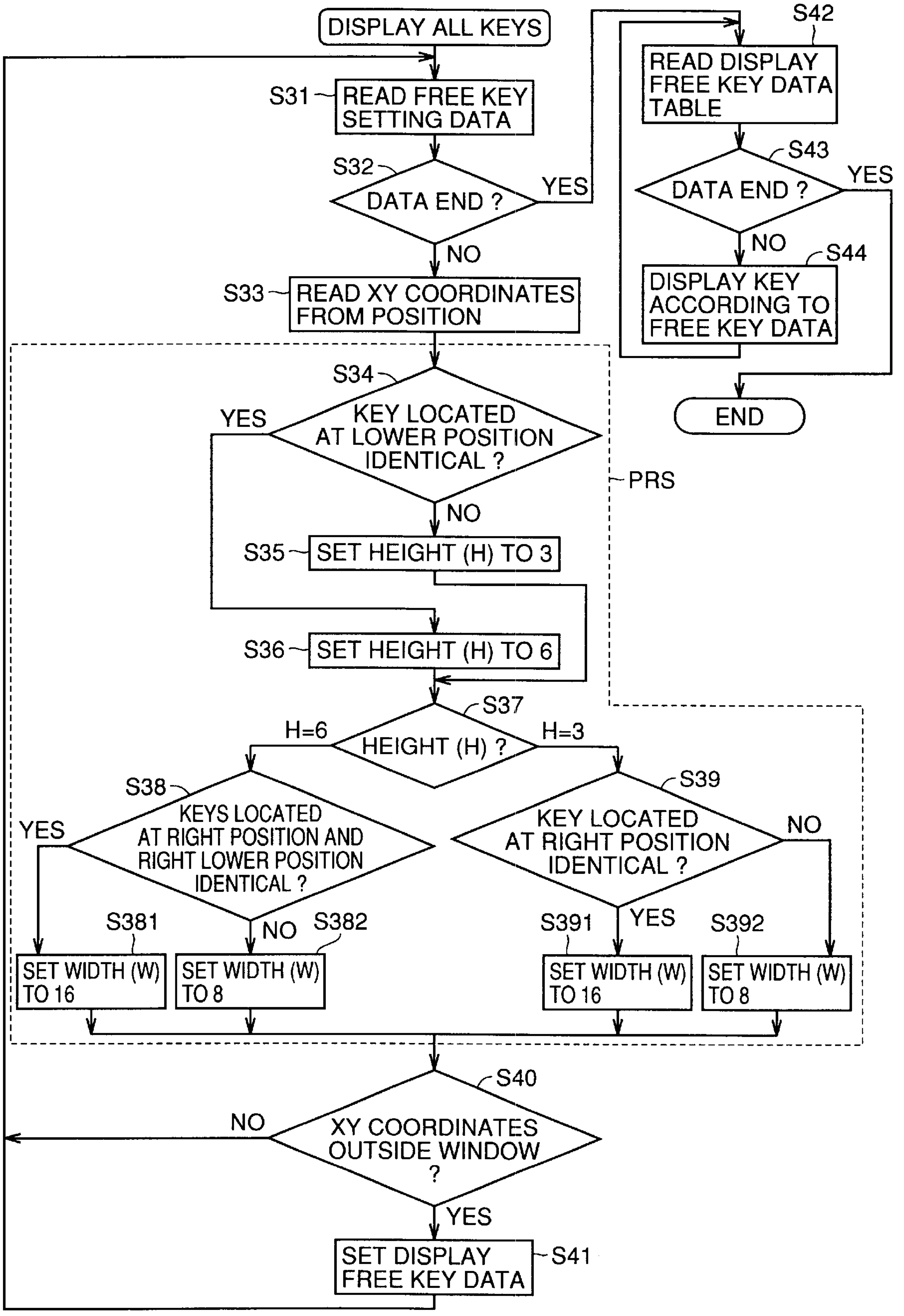
FIG. 23 shows a process flow chart when the free key is set according to an embodiment of the present invention.
Figure 24:
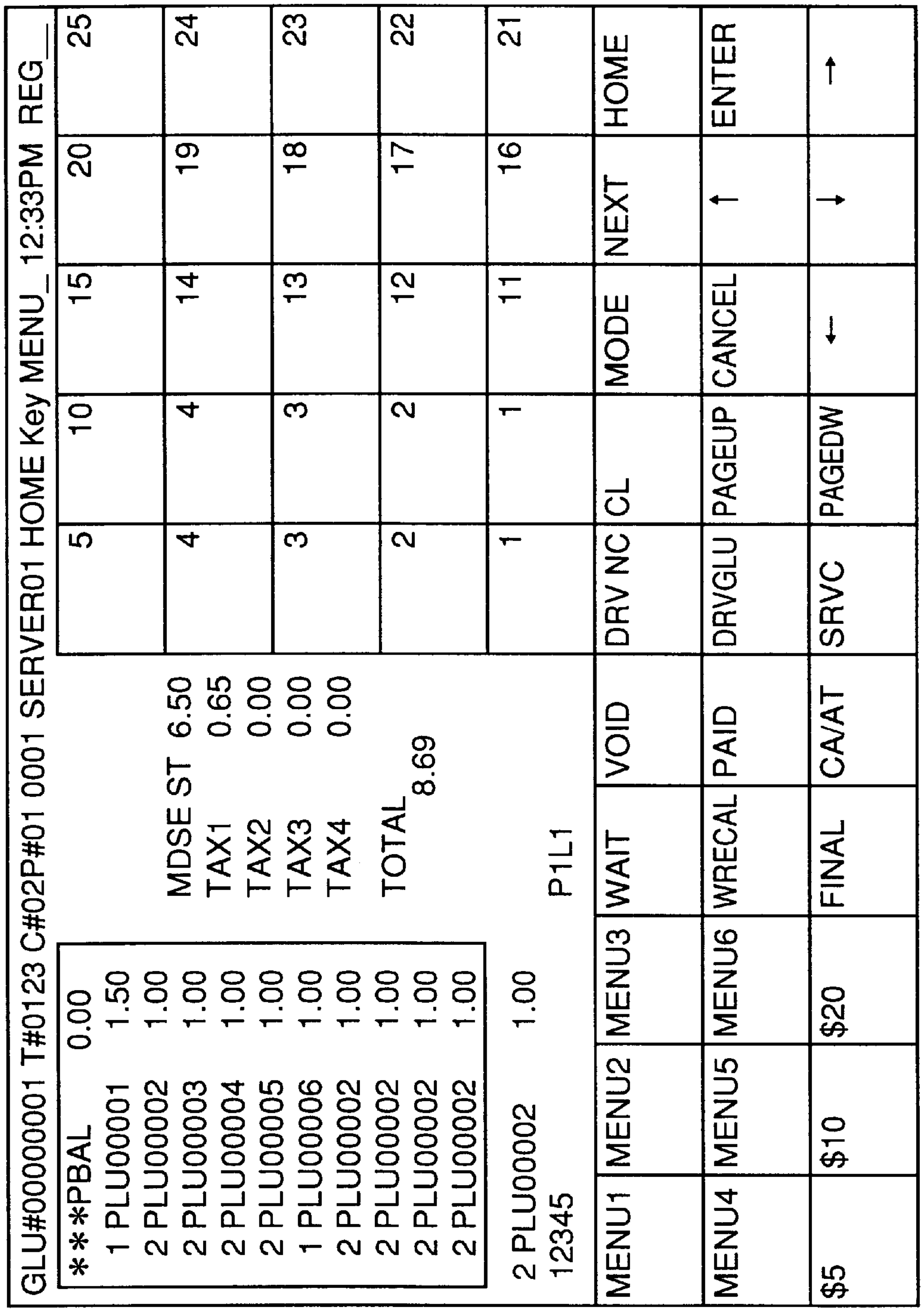
FIG. 24 shows an example of a display screen displayed in the process of FIG. 23 of a key layout when the free key is set.
Figure 25:
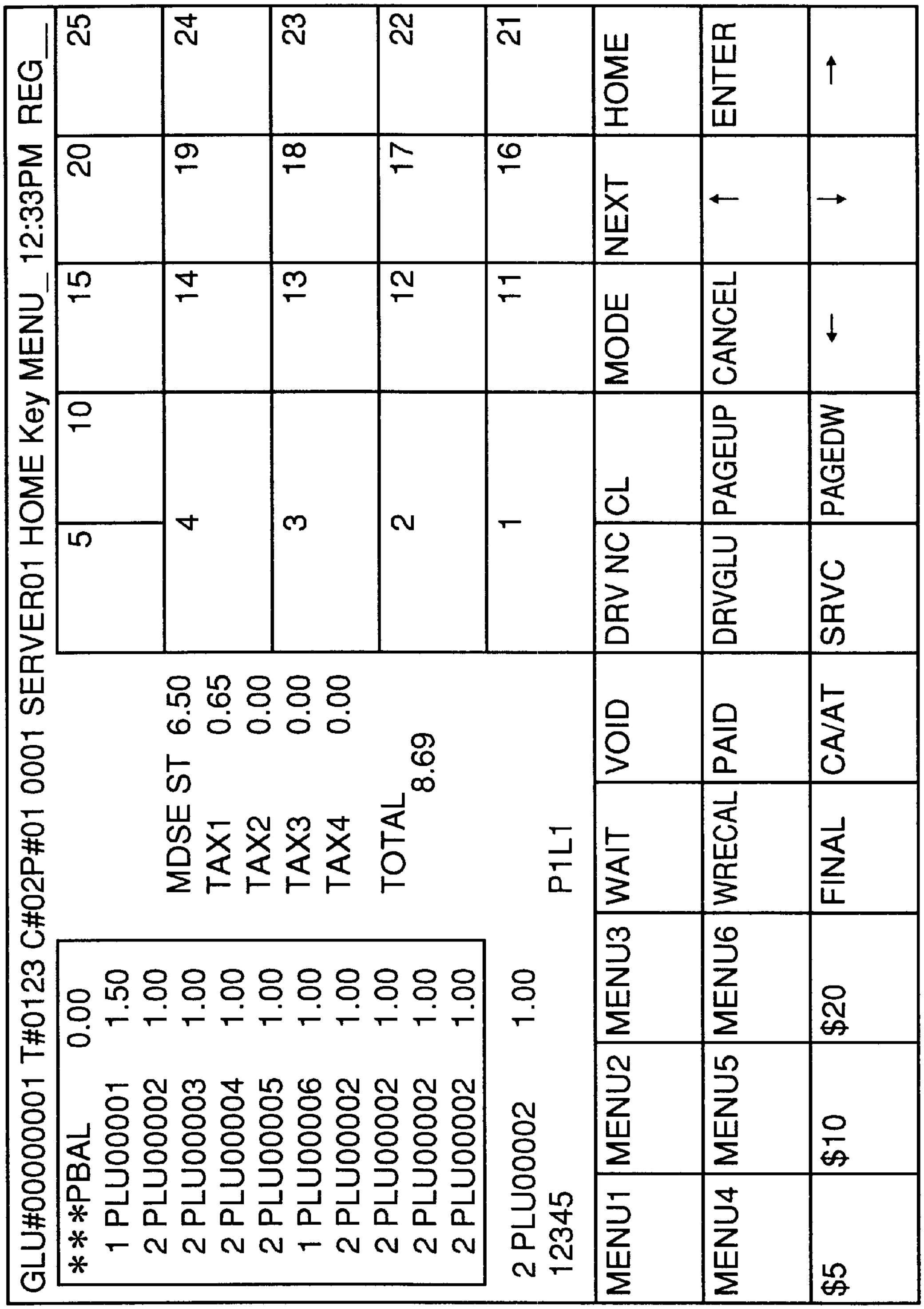
FIG. 25 shows an example of a display screen displayed in the process of FIG. 23 of the key layout after the free key is set.

For example, when two keys assigned with the same SKSN code are set adjacent in the horizontal direction as shown in FIG. 24, the two keys are displayed as one key with the preset smallest key size enlarged in the horizontal direction (direction of width) according to the process of FIG. 23, as shown in FIG. 25. Although the case adjacent in the vertical direction is not illustrated, it is appreciated that a similar one key having the smallest key size enlarged in the vertical direction (the direction of width) is displayed.

Figure 26:
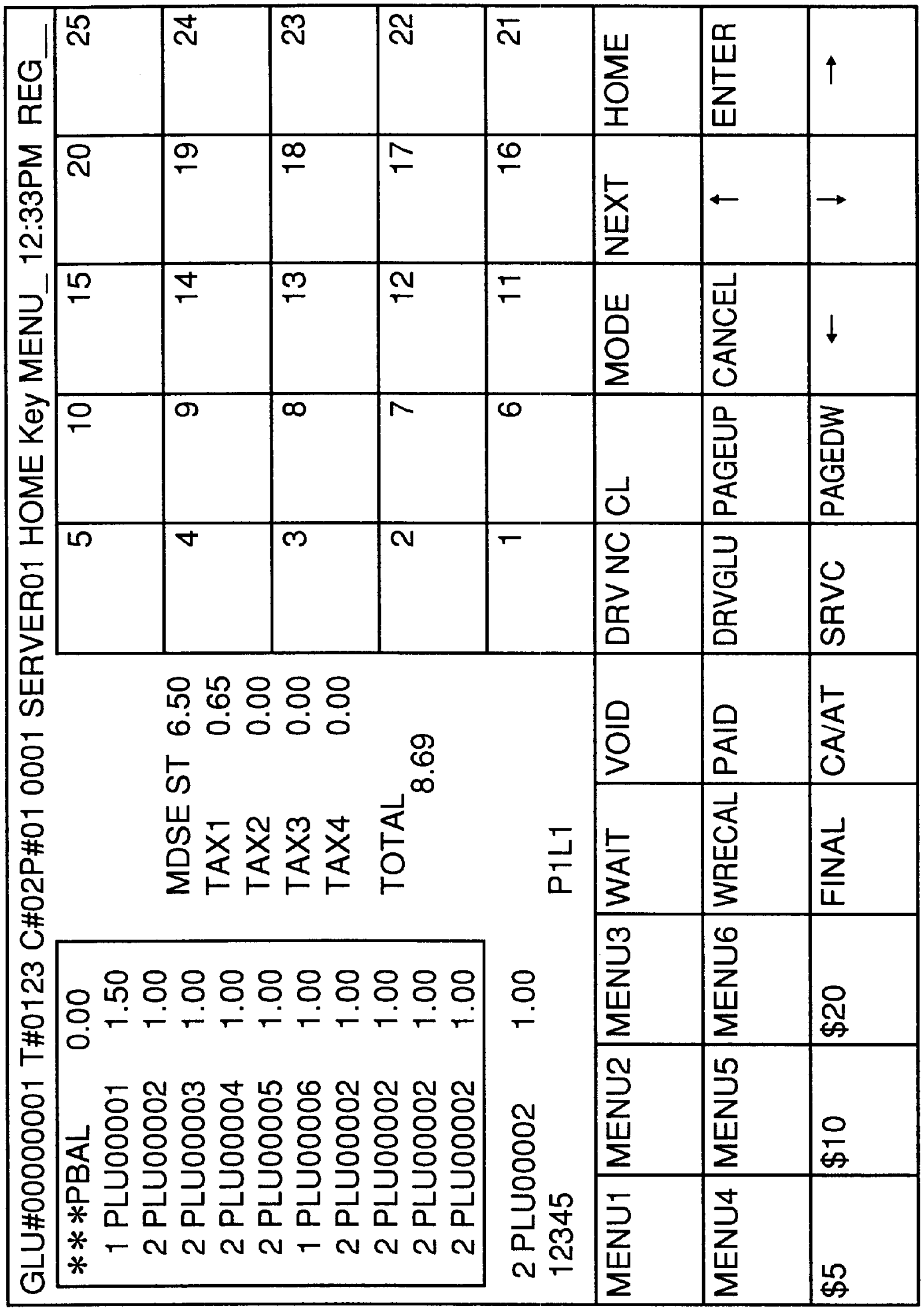
FIG. 26 shows an example of a display screen displayed in the process of FIG. 23 of the key layout when a home screen is set.
Figure 27:
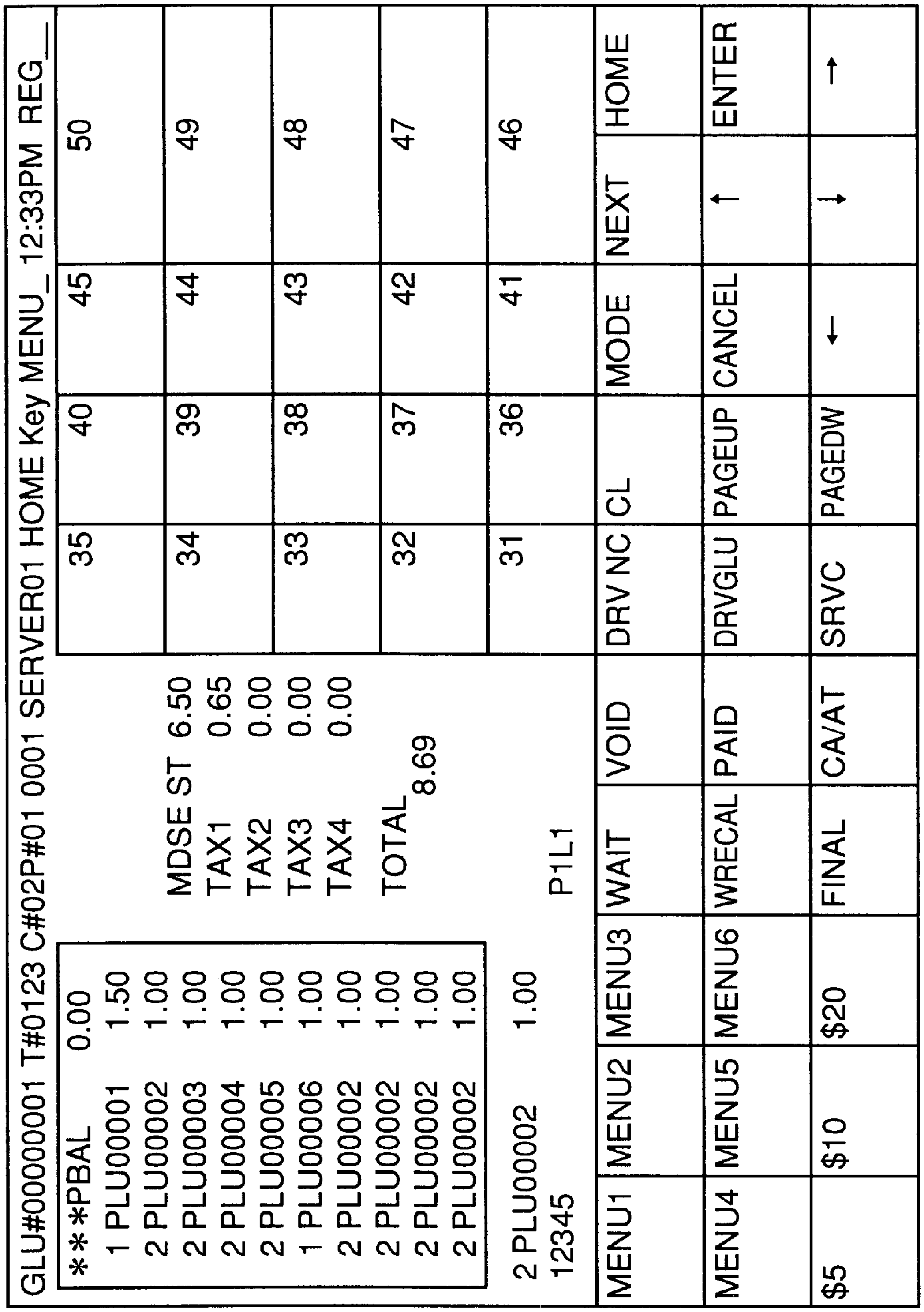
FIG. 27 shows an example of a display screen displayed in the process of FIG. 23 of the key layout when a function screen is set.

By copying the contents of function screen free key setting table 32 corresponding to the function screen of FIG. 27 into home screen free key setting table 31 in the setting process of the home screen of FIG. 26, the home screen can have the setting easily modified.

Another process to modify the size of the layout key will be described with reference to FIG. 28. Process PRS1 of the flow chart of FIG. 28 has process PRS enclosed by the broken line in the flow chart of FIG. 23 partially modified.

Figure 28:
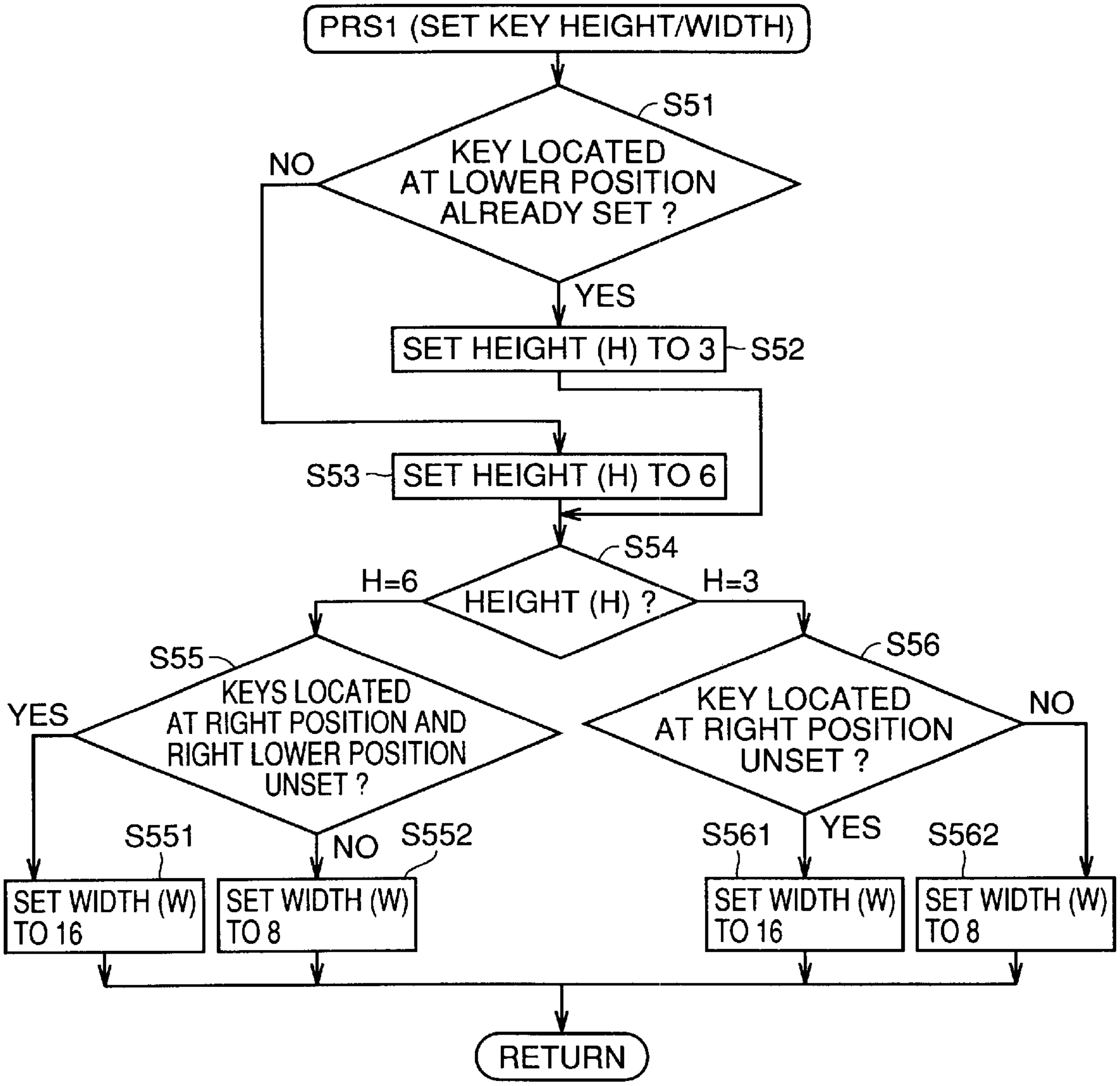
FIG. 28 shows other process flow chart in setting the free key according to an embodiment of the present invention.

Prior to the process of FIG. 28, CPU 1 sequentially reads in the set data (position number 31A and SKSN code 31B) from home screen free key setting table 31 corresponding to a preselected screen, for example, a home screen. Then, the corresponding XY coordinate data 33B and 33C are read in from display free key data table 33 corresponding to the relevant home screen. The steps up to this process are similar to those of the process of steps S31–S33 of FIG. 23.

In the process of FIG. 28, CPU 1 modifies the size of the layout set key. More specifically, determination is made whether SKSN code 31B of the key located below the current key corresponding to the currently read in data (position number 31A) from table 31 is already set or not, i.e., whether SKSN code 31B is not "NON" from the corresponding contents in home screen free key setting table 31 (step S51). When SKSN code 31B is already set, the height of the current key is set as 3 (step S52). When not yet set, the height of the current key is set to 6 (step S53). Then, the width of the current key is set to 8 or 16 according to the: determination of whether the key located at the right position or light lower position to the current key is unset or not and the current key height (3 or 6). More specifically, when the height is 6, the current key width is set to 16 when the key located at the right position and right lower position to the current key is not yet set, otherwise the width is set to 8. When the height is 3, the current key width is set to 16 when the key located rightward to the current key is not yet set, otherwise the width is set to 8.

Following completion of the process of FIG. 28, control returns to the process of steps S40 and et seq. shown in FIG. 23.

Figure 29:
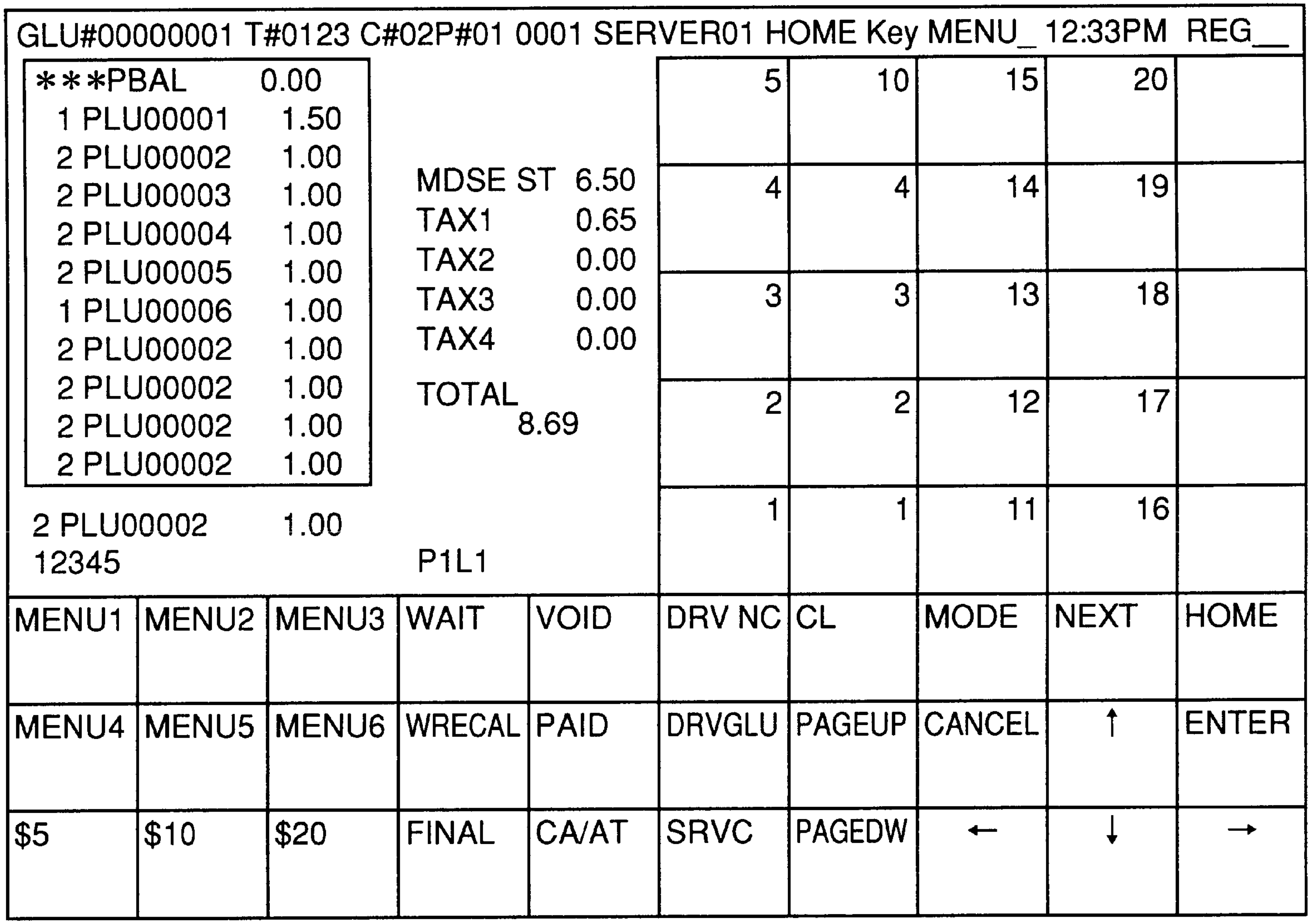
FIG. 29 shows an example of a key layout display screen displayed in the process of FIG. 28 when the free key is set.
Figure 30:
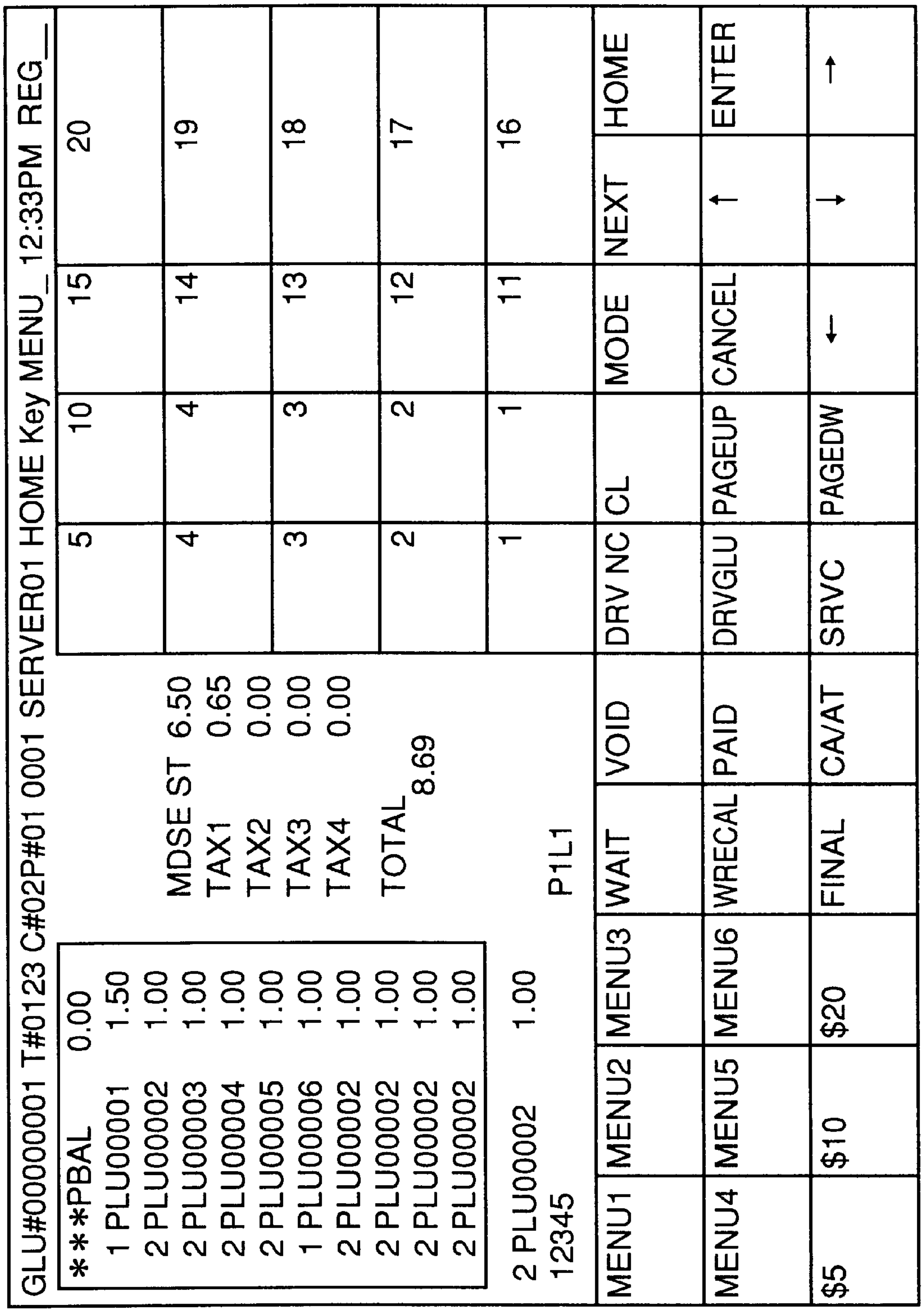
FIG. 30 shows an example of key layout display screen displayed in the process of FIG. 28 after the free key is set.

When a key with an unset SKSN code 31B is located adjacent to the current key in the horizontal direction (although not shown, vertical direction is also possible) as shown in FIG. 29, the two keys are displayed as one key having the smallest key size enlarged in the horizontal direction as shown in FIG. 30 according to the process of FIG. 28.

The process of displaying a label in the frame of a key displayed at display unit 6 to identify that key will be described hereinafter. An appellation formed of text data to identify a relevant key is shown in the label. The display size (height and width) of a key is variably set according to the number of characters of the text data. Keys assigned with labels are keys of the type provided corresponding to product items (such as juice, hamburger) and the like, called direct keys. The designation (text) indicated in the label allocated to a direct key is called "direct key text".

Figure 31:
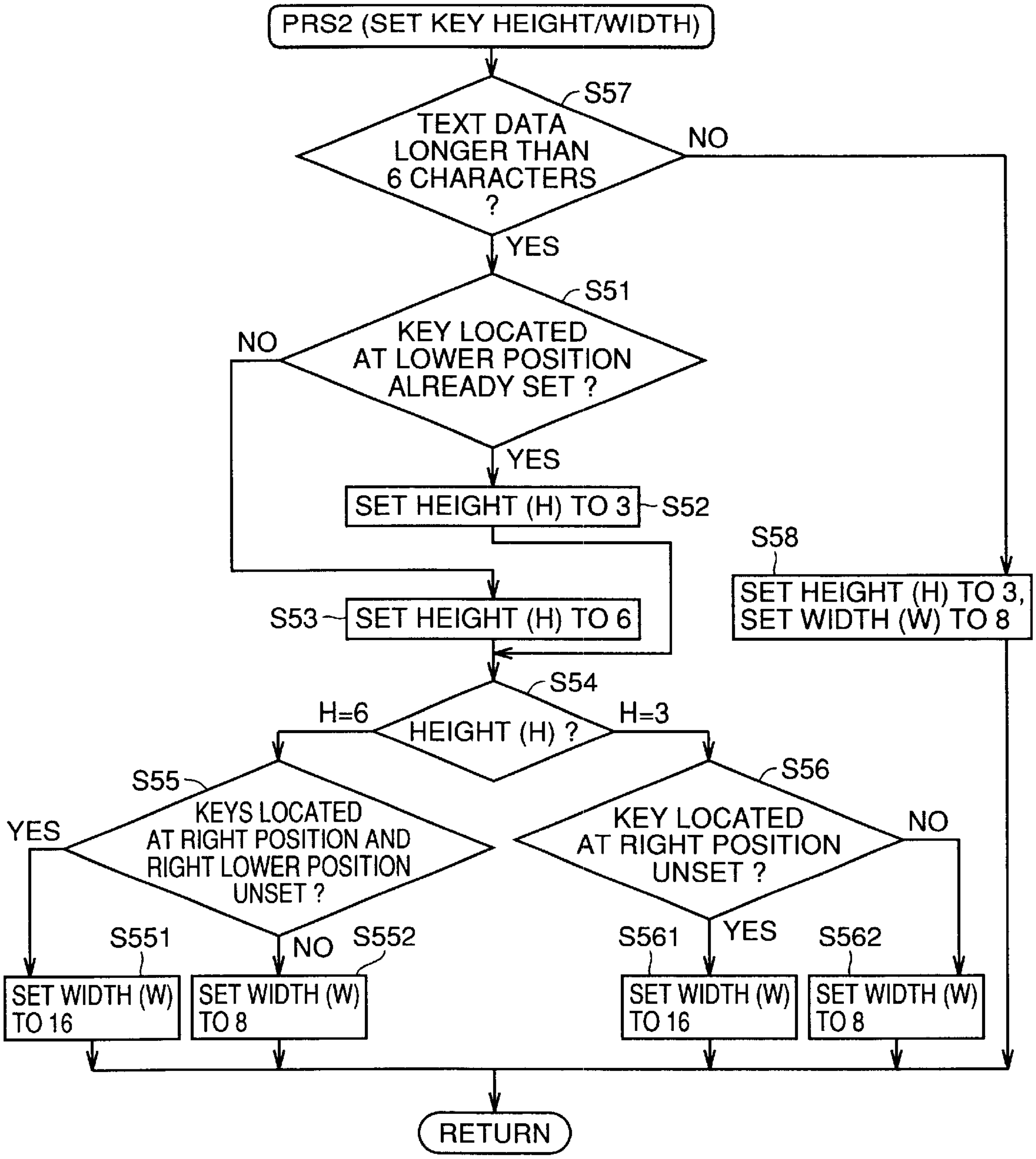
FIG. 31 is a process flow chart in setting the text of a free key according to an embodiment of the present invention.

FIG. 31 shows the process of setting the key size variable according to the data length (character length) of the direct key text. Process PRS2 in the flow chart of FIG. 31 corresponds to process PRS1 shown in the flow chart of FIG. 28 with the additional process of steps S57 and S58.

Referring to FIG. 31, data (position number 31A and SKSN code 31B) corresponding to the current key is read out from home screen free key setting table 31 corresponding to a preselected screen, for example, a home screen. A SKSN code 34A corresponding to the read out SKSN code 31B is identified in display free key text data table 34 corresponding to the relevant home screen. Text data 34B corresponding to the identified SKSN 34A is read out. Determination is made whether the number of characters of text data 34B read out is greater than 6 characters or not (step S57). When the number of characters of text data 34B is not more than 6 characters, the height of 3 and width of 8 are set as the key size. Then, the process ends (step S58). When the number of characters of text data 34B read out is greater than 6 characters at step S57, the process corresponding to the flow chart of FIG. 28 is carried out.

Figure 32:
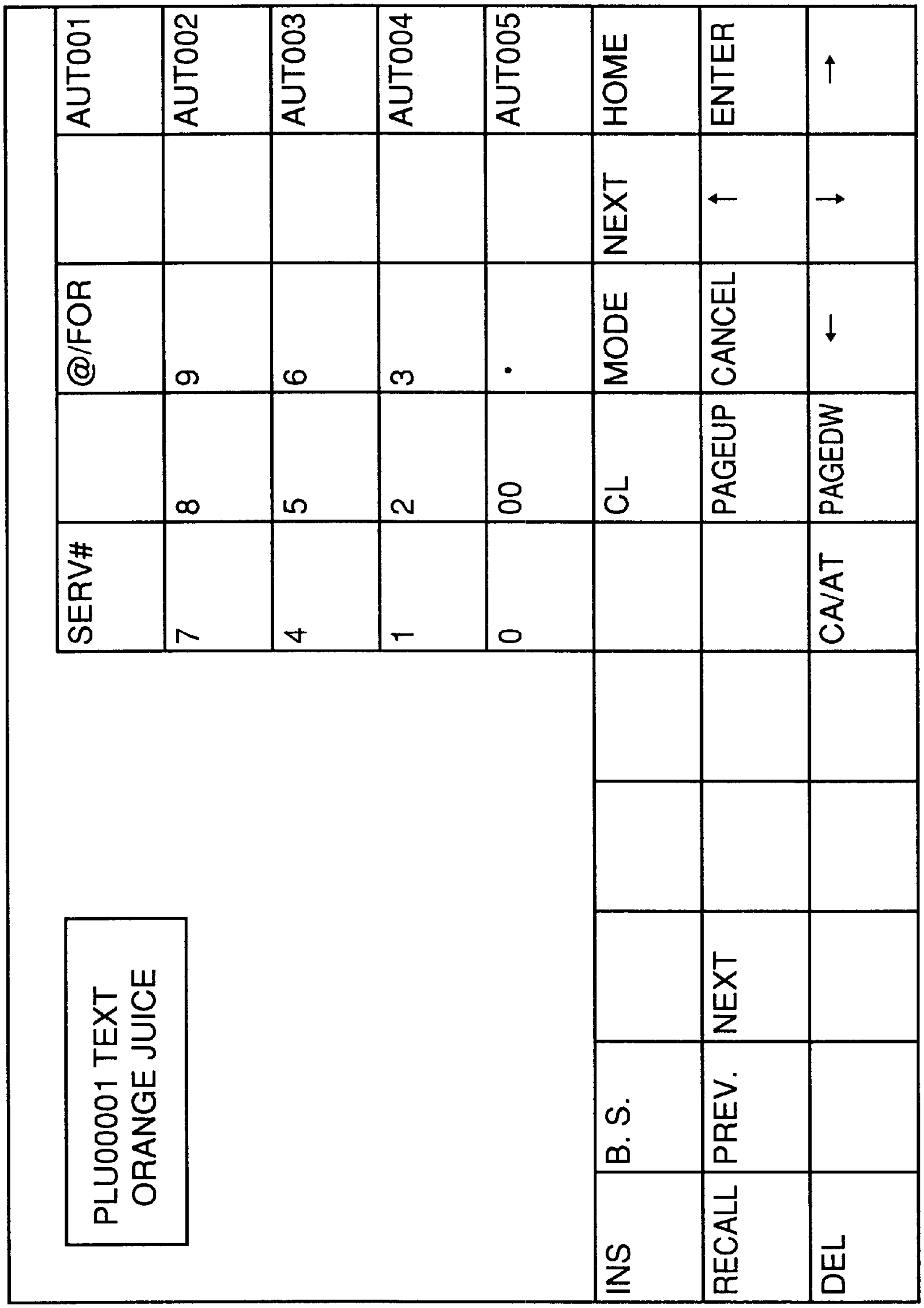
FIG. 32 shows an example of a set screen displayed in the process of FIG. 31 when the text of the free key is set.
Figure 33:
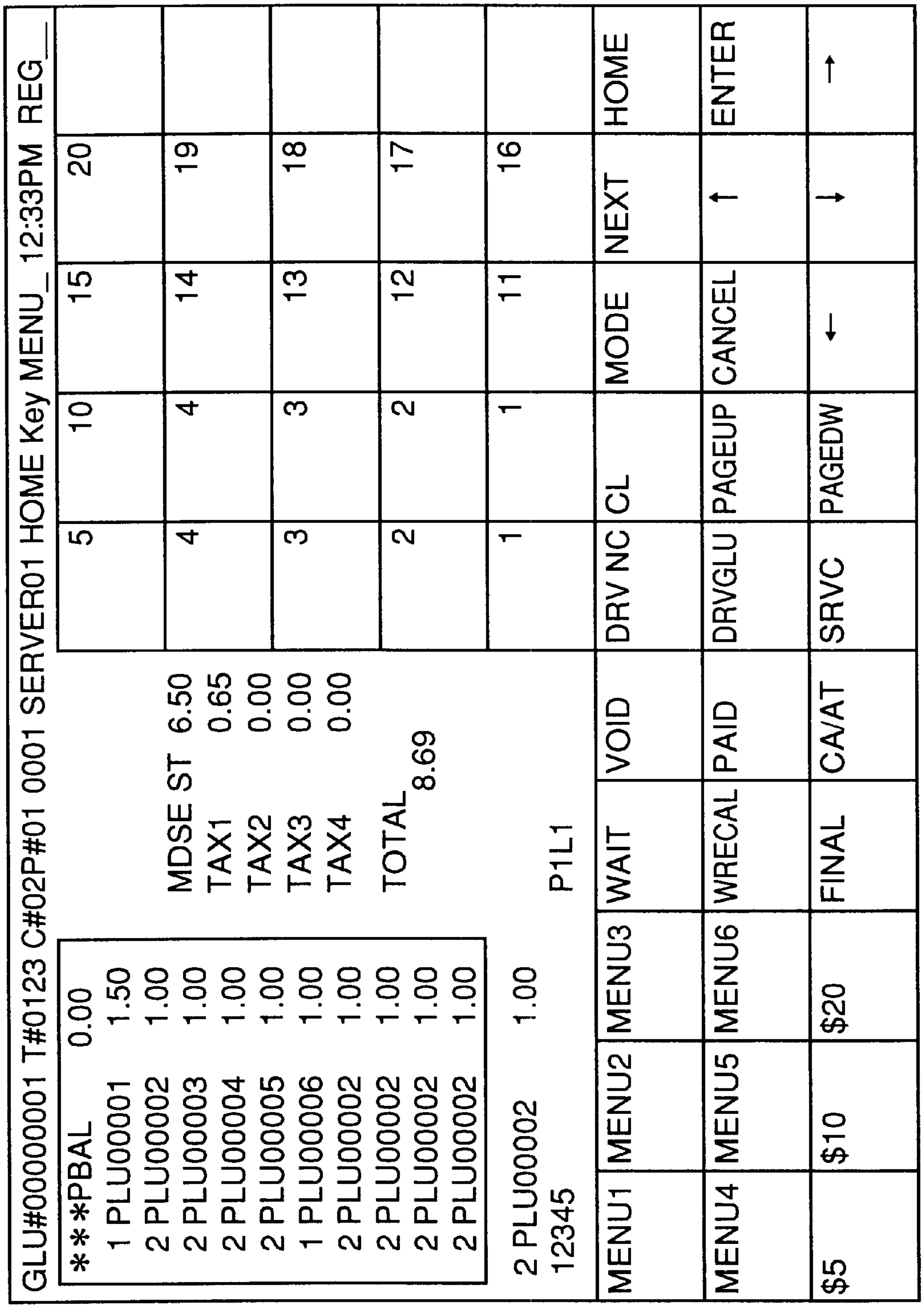
FIG. 33 shows an example of a key layout display screen displayed in the process of FIG. 31 when the free key is set.
Figure 34:
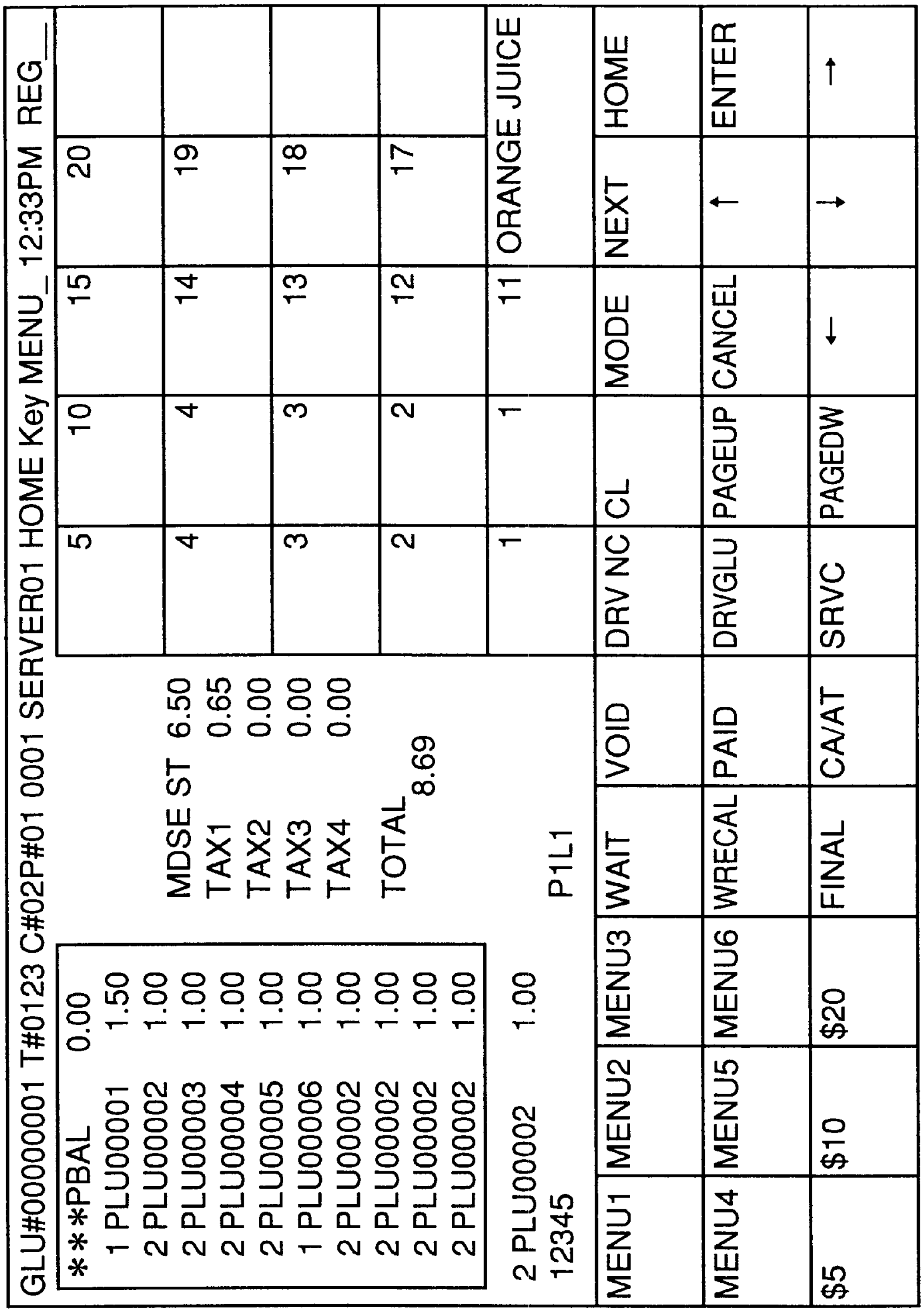
FIG. 34 shows an example of a key layout display screen after the free key is set in the process of FIG. 31.

FIG. 32 shows an example of a set screen in setting a direct key text. In order to set "ORANGE JUICE" as the direct key text for direct key 16, for example, as shown in FIG. 32 according to the process of the flow chart of FIG. 31, the smallest key size of direct key 16 is increased in the width direction as shown in FIG. 34 when the key located rightward to direct key 16 is not yet set as shown in FIG. 33. Using the area of 16 characters corresponding to one horizontal row in the display region (3×16) of direct key 16, text data of "ORANGE JUICE" is displayed therein.

Figure 35:
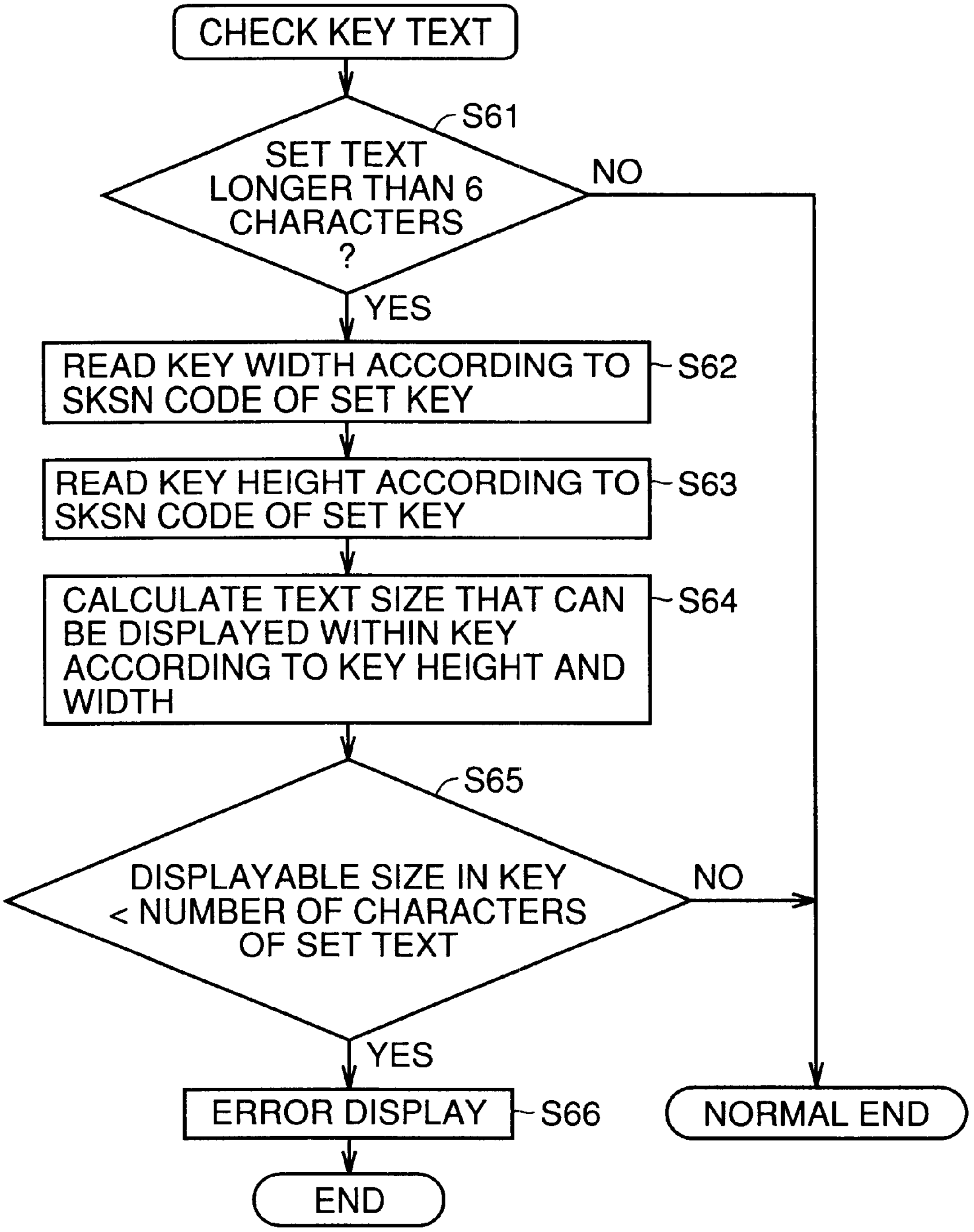
FIG. 35 is a flow chart of a text size error process according to an embodiment of the present invention.

When determination is made at step S57 that the number of characters of text data 34B is larger than 6 characters and the key size cannot be enlarged even when the process of steps S51–S56 is executed, that text data 34B cannot be displayed corresponding to one direct key. In this case, an error message or the like must be provided to notify the operator. FIG. 35 shows the processing operation in such a case.

Referring to the flow chart of FIG. 35, determination is made whether the length of the direct key text (text data 34B) set corresponding to the current key in FIG. 32 is longer than 6 characters (step S61). When the key text length is not longer than 6 characters, determination is made that key text display can be effected properly, and the process ends. When the key text length is longer than 6 characters, the corresponding width data 33D and height data 33E are read out from display free key data table 33 according to SKSN code 31B corresponding to the current key (steps S62 and S63). According to width data 33D and height data 33E read out, the number of characters of the direct key text that can be displayed is calculated by the following equation (step S63).

$$SIZE=(W-2)\times(H-2)$$

W indicates width data 33A, H indicates height data 33E, and SIZE indicates the number of characters of text that can be displayed within the size of the current key.

Figure 36:
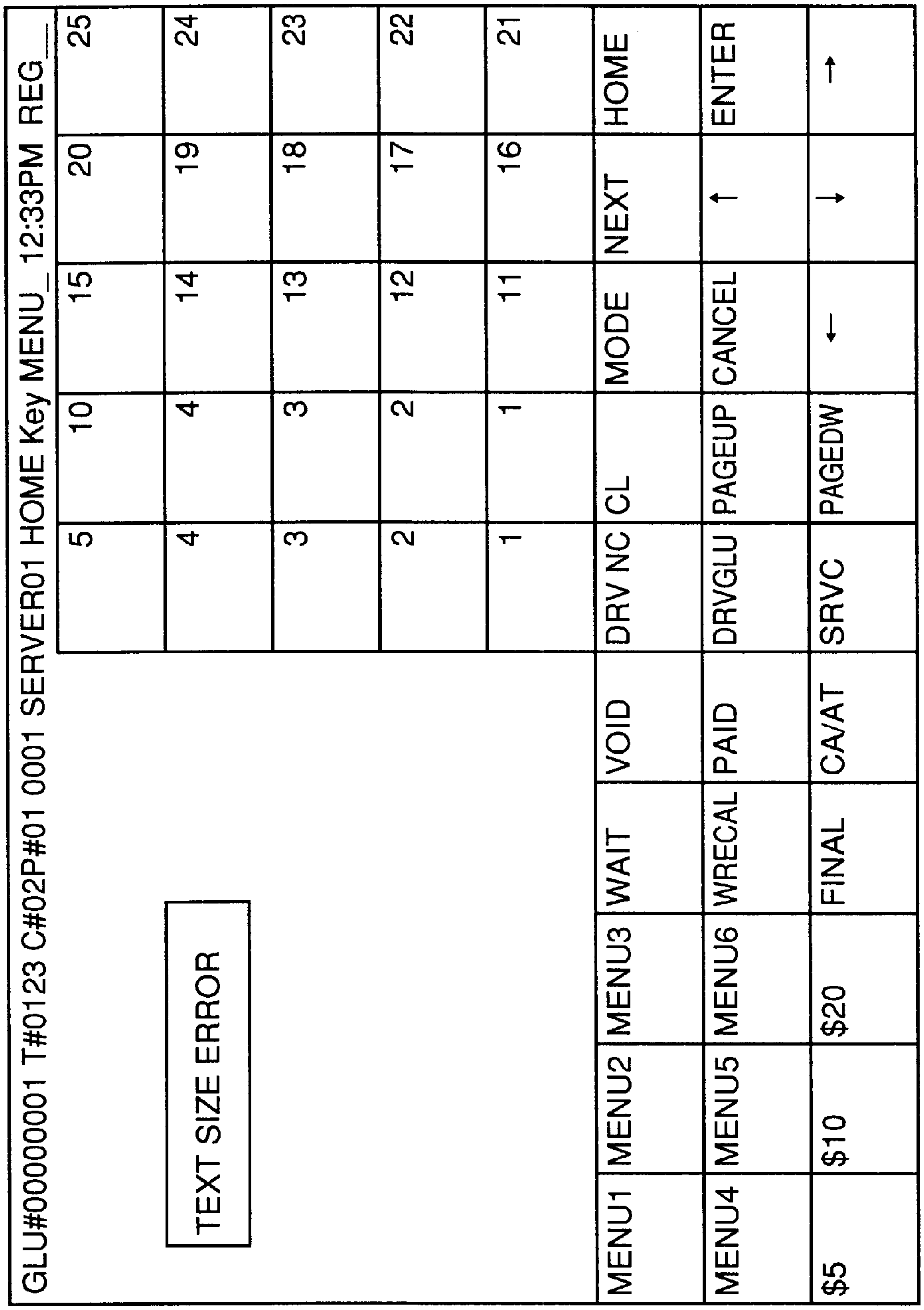
FIG. 36 shows an example of a text size error display displayed in the process of FIG. 35.

The number of characters (SIZE) obtained by the above calculation is compared to the number of characters of text data 34B set corresponding to the current key (step S65). When the number of characters of set text data 34B is smaller than the calculated number of characters (SIZE), determination is made that the display can be provided properly, and the process ends. Otherwise, determination is made that the display cannot be provided, and a message such as "TEXT SIZE ERROR" is provided on the display screen as shown in FIG. 36 (step S66). Then, the process ends.

Since determination is made whether text data 34B arbitrarily set in display free key text data table 34 can be displayed or not in the region corresponding to the size of the relevant key and the result thereof notified, the user can quickly modify the corresponding text data 34B.

Figure 37:
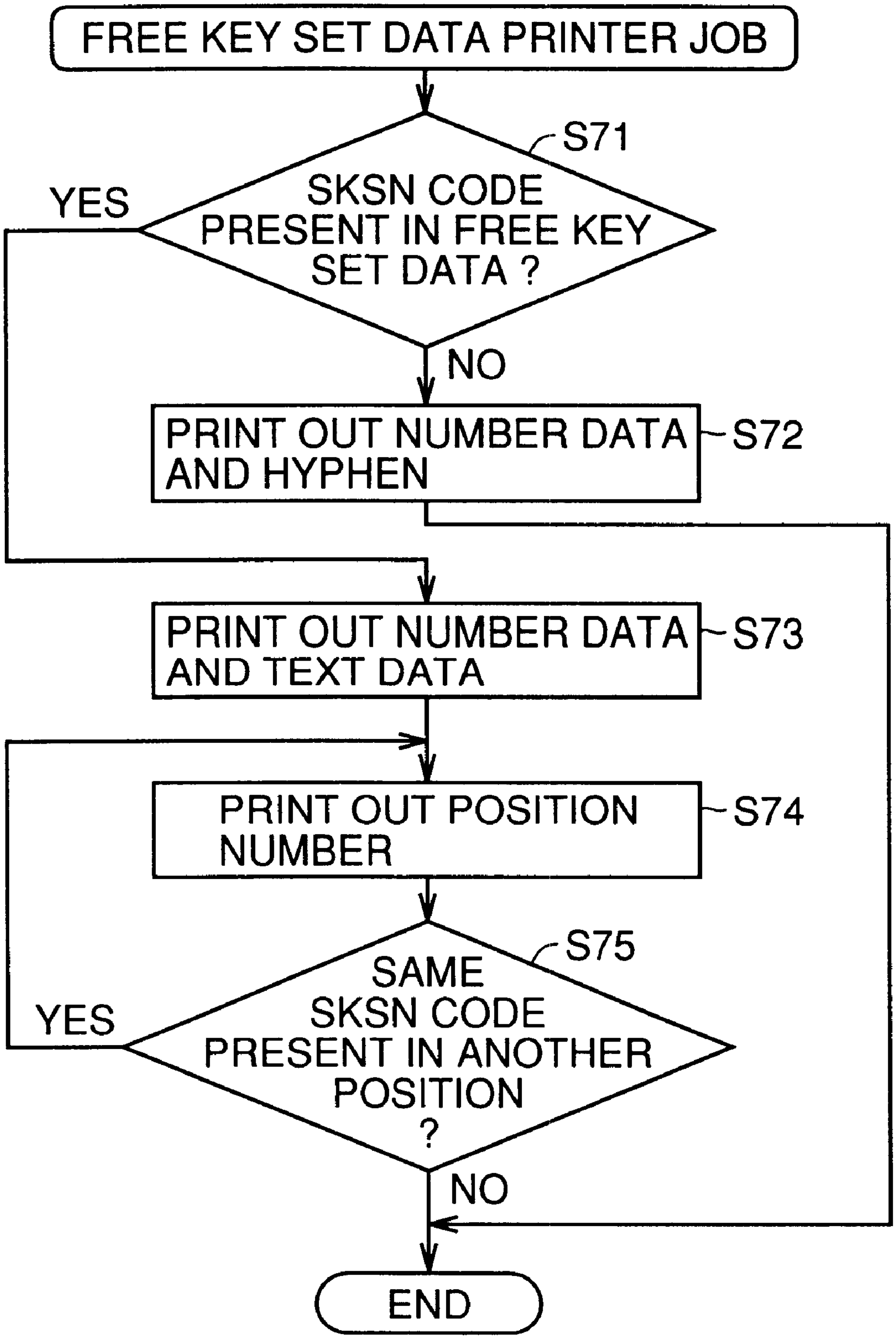
FIG. 37 is a flow chart to describe the output processing operation of the printer according to an embodiment of the present invention.

FIG. 37 shows the process of notifying the key layout set state to the user by providing a printout through printer 5. A menu screen (not shown) to select the operation mode of the ECR is displayed. A mode of examining the key layout set state of a desired screen, for example a home screen, is selected, whereby the relevant mode is set. Here, SKSN code 35B is sequentially read out corresponding to number data 35A in the ascending order from SKSN code table 35. The process of FIG. 37 is carried out for each SKSN code 35B that is read out.

First in FIG. 37, determination is made whether SKSN code 31B matching SKSN code 35B read out is present in home screen free key setting table 31 corresponding to the desired home screen (step S71). When a matching SKSN code 31B is not present, number data 35A corresponding to SKSN code table 35 and a corresponding-hyphen sign are printed out (step S72). Therefore, SKSN code 35B identified by number data 35A is assigned with a mark indicating that it is not yet set in the home screen. When a matching SKSN code 31B is present in free key setting table 31 of the corresponding home screen, display free key text data table 34 is searched for according to that SKSN code 35B to read out text data 34B corresponding to the matching SKSN code 34A. Text data 34B read out is printed out together with code data 35A corresponding to SKSN code 35B from printer 5 (step S73). Then, a corresponding position number 31A is read out from free key setting table 31 of the relevant home screen to be printed out through printer 5 (step S74). Next, determination is made whether a SKSN code 31B matching the value of that SKSN code 35B is present in home screen free key setting table 31 (step S75). When there is another matching SKSN code 31B, control returns to step S74 to read out a corresponding position number 31A from home screen free key setting table 31. That position number 31A is printed out through printer 5. When there is no other SKSN code 31B, the process ends.

Figure 38:
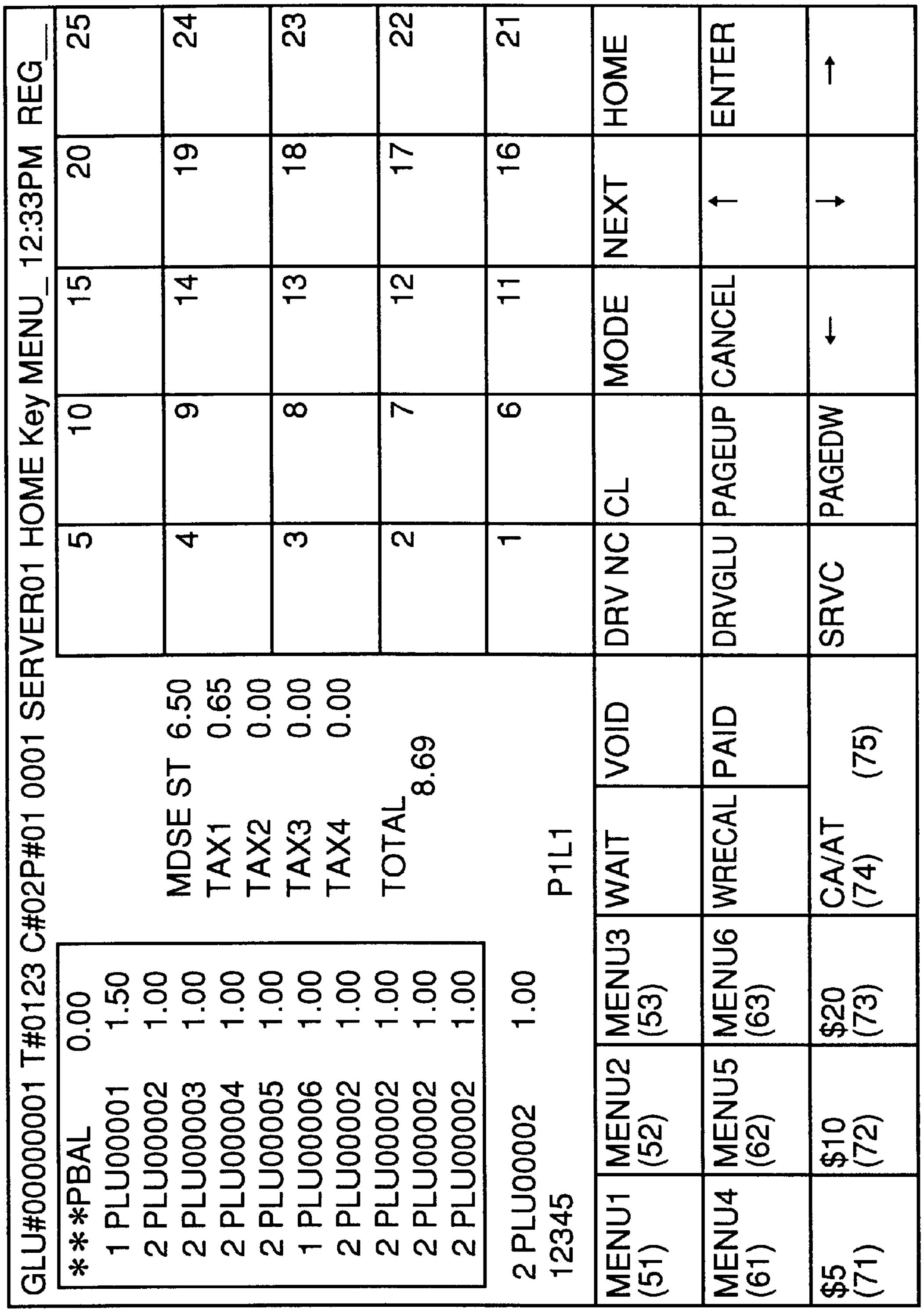
FIG. 38 shows a key layout display screen in setting a free key used in the process of FIG. 37.
Figure 39:
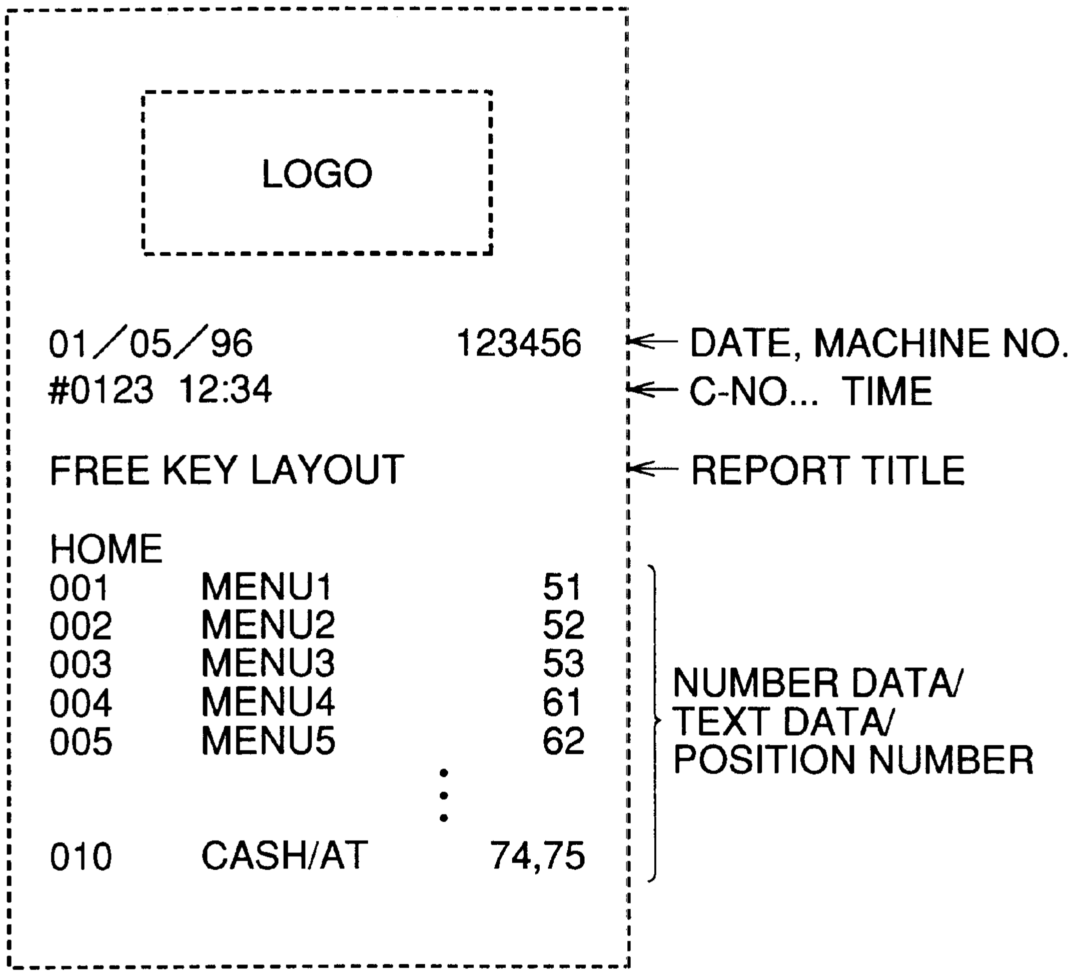
FIG. 39 shows an example of the printout according to the process of FIG. 37.

Even if a key assigned with "CA/TA" as the SKSN code is set in the home screen as an enlarged key as shown in FIG. 38, for example, the user can quickly recognize the set state by just looking at the print out of FIG. 39.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A key layout setting apparatus to set layout data to determine layout of a plurality of keys on a display screen having at least one home screen and at least one function screen in a data input apparatus, wherein said display screen is provided with a touch panel to register an item corresponding to a key by operation through said touch panel of an arbitrary key out of said plurality of keys laid out and displayed on said display screen according to said layout data, said key layout setting apparatus comprising:

a microprocessor in communication with said display screen and said touch screen of said display screen, wherein said microprocessor comprises a central processing unit, at least one random access memory, and at least one read-only memory, for setting and modifying said layout data, said microprocessor including key size select means to select a desired key size from a plurality of key sizes, wherein said key size select means determines key size by comparing SKSN codes stored in one or more database files in said random access memory of adjacent keys of said plurality of keys, and wherein key size remains the same if SKSN codes of adjacent keys differ and key size increases if SKSN codes of adjacent keys are the same.

2. The key layout setting apparatus according to claim 1, wherein a region of said display screen includes a key region to display said plurality of keys and a data region to display various data, said microprocessor further including region size select means for selecting a desired region size from a plurality of region sizes, wherein said layout data is set so that said data is laid out on said display screen according to said desired region size selected by said region size select means.

3. The key layout setting apparatus according to claim 1, said microprocessor further including first layout setting means, wherein said first layout setting means sets layout data according to a desired setting style selected from a plurality of predetermined setting styles stored in said random access memory when new said layout data is set.

4. The key layout setting apparatus according to claim 3, further comprising layout data storage means for storing at least one type of said layout data set by said microprocessor, wherein said plurality of predetermined setting styles includes a modify style and a copy style, wherein said first layout setting means sets a desired layout data out of said at least one type of layout data stored in said layout data storage means as said new layout data when said copy style is selected, wherein a desired layout data out of said at least one type of layout data stored in said layout data storage means has a desired portion modified and then set as said new layout data when said modified style is selected.

5. The key layout setting apparatus according to claim 1, wherein said layout data includes for each of said plurality of keys a key size data indicating a size of a key when displayed and an identify code identifying a type of said item registered in said data input apparatus according to operation of said key, said key layout setting apparatus further comprising key size modify means for modifying said key size data of a predetermined key according to said identify codes corresponding to said predetermined key and a key adjacent to said predetermined key or a set state of said identify code corresponding to said adjacent key when in a key size modify mode to modify said key size data.

6. The key layout setting apparatus according to claim 5, wherein said key size modify means includes first key size modify means for modifying said key size data of said predetermined key so as to include said key size data of said adjacent key when said identify code set corresponding to said predetermined key and said identify code set corresponding to said adjacent key are identical.

7. The key layout setting apparatus according to claim 5, wherein said key size modify means includes second key size modify means modifying said key size data of said predetermined key so as to include said key size data of said adjacent key when said identify code corresponding to said adjacent key is not yet set.

8. The key layout setting apparatus according to claim 7, further comprising key label input means for entering a label identifying a key on said display screen, and correspondingly displayed on said key, wherein said key size modify means executes said second key size modify means for said predetermined key when the number of characters shown in said label of said predetermined key input through said key label input means exceeds a predetermined number of characters.

9. The key layout setting apparatus according to claim 8, wherein an error of said input label size is notified when said key size of said predetermined key is not enlarged to a size that allows display of the number of characters indicated in said label of said predetermined key input through said key label input means as a result of execution of said second key size modify means.

10. The key layout setting apparatus according to claim 1, further comprising output means to read out and provide said layout data from said layout data storage means.

11. A key layout setting method to set layout data to determine layout of a plurality of keys on a display screen of a data input apparatus including the display screen provided with a touch panel to register an item corresponding to a key by operation though said touch panel of an arbitrary key out of said plurality of keys laid out and displayed on said display screen according to said layout data, said key layout setting method comprising:

a layout data setting step to set said layout data, said layout data setting step further comprising a key size select step to select a desired key size from said plurality of key sizes, wherein said key size select step determines and sets key size by comparing SKSN codes of adjacent keys of said plurality of keys, which codes are stored in one or more database files in a random access memory, and wherein key size remains the same if SKSN codes of adjacent keys differ and key size increases if SKSN codes of adjacent keys are the same.

12. A computer-readable recording medium in which a key layout set program is recorded to have a key layout setting method to set layout data to determine the layout of a plurality of keys on a display screen executed by a computer in a data input apparatus including said display screen provided with a touch panel to register an item corresponding to a key by operation through said touch panel of an arbitrary key out of said plurality of keys laid out and displayed on said display screen according to said layout data, said key layout setting method comprising a layout data setting step to set said layout data, said layout data setting step including a key size select step to select a desired key size from a plurality of key sizes, wherein said key size select step includes determining key size by comparing SKSN codes stored in one or more database files in said random access memory of adjacent keys of said plurality of keys, and wherein key size remains the same if SKSN codes of adjacent keys differ and key size increases if SKSN codes of adjacent keys are the same.

13. A computer program product for use in conjunction with a microprocessor, said computer program product comprising a layout data setting program to set layout data to determine the layout of a plurality of keys on a display screen in a data input apparatus including the display screen provided with a touch panel to register an item corresponding to a key by operation through said touch panel of an arbitrary key out of said plurality of keys laid out and displayed on said display screen according to said layout data, said layout data setting program including a key size select program to select a desired key size from a plurality of key sizes, wherein said key size select program determines key size by comparing SKSN codes stored in one or more database files in said random access memory of adjacent keys of said plurality of keys, and wherein key size remains the same if SKSN codes of adjacent keys differ and, key size increases if SKSN codes of adjacent keys are the same.

* * * * *